(12) United States Patent
Goto

(10) Patent No.: US 10,140,852 B2
(45) Date of Patent: *Nov. 27, 2018

(54) REMOTE CONTROL DEVICE, SERVER, METHOD, AND COMPUTER PROGRAM

(71) Applicant: GLAMO, INC., Kiyose-shi, Tokyo (JP)

(72) Inventor: Isao Goto, Kiyose (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/627,456

(22) Filed: Jun. 20, 2017

(65) Prior Publication Data

US 2017/0294115 A1  Oct. 12, 2017

Related U.S. Application Data

(63) Continuation of application No. 14/860,649, filed on Sep. 21, 2015, now Pat. No. 9,704,388, which is a (Continued)

(30) Foreign Application Priority Data

May 9, 2011 (JP) ................... 2011-104016

(51) Int. Cl.
    *H04L 12/28* (2006.01)
    *G08C 17/02* (2006.01)
    *H04N 21/436* (2011.01)
    *H04N 21/422* (2011.01)
    *G05B 15/02* (2006.01)

(52) U.S. Cl.
    CPC ............ *G08C 17/02* (2013.01); *G05B 15/02* (2013.01); *H04L 12/28* (2013.01); *H04L 12/2803* (2013.01); *H04L 12/2816* (2013.01); *H04L 12/2818* (2013.01); *H04L 12/2821* (2013.01);
(Continued)

(58) Field of Classification Search
CPC . H04L 12/28; H04L 12/2803; H04L 12/2816; H04L 12/2818; H04N 21/42204; H04N 21/43615
See application file for complete search history.

(56) References Cited

U.S. PATENT DOCUMENTS 9,176,486 B2 * 11/2015 Goto .................. G05B 15/02
9,704,388 B2 *  7/2017 Goto .................. G05B 15/02
(Continued)

*Primary Examiner* — Andrew W Bee

(57) ABSTRACT

A mobile terminal 1A is configured to communicate with a remote control server 4A that transmits a remote control signal to operate an operation object apparatus via a particular local area network NW2 or a wide area communication network NW1. A permission/rejection information storage part 102 stores whether execution of remote control operation based on the operation instruction information is permitted or rejected when each operation instruction information has gone through any communication network. When receiving the input of operation instruction information, a communication network discrimination part 106 discriminates with which communication network communication has established. An operation permission/rejection decision part 107 decides permission/rejection of execution of the operation instruction information according to the results. When remote control operation based on operation instruction information is permitted as a result of decision, operation instruction information is transmitted to the remote control server 4A.

5 Claims, 25 Drawing Sheets

Related U.S. Application Data continuation of application No. 13/466,863, filed on May 8, 2012, now Pat. No. 9,176,486.

(60) Provisional application No. 61/500,632, filed on Jun. 24, 2011.

(52) U.S. Cl.
CPC . *H04N 21/42204* (2013.01); *H04N 21/43615* (2013.01)

(56) References Cited

U.S. PATENT DOCUMENTS

| | | | | |
|---|---|---|---|---|
| 2002/0023266 | A1* | 2/2002 | Kawana | H04N 5/4401 725/81 |
| 2004/0151179 | A1* | 8/2004 | Andre | H04L 29/06 370/392 |
| 2006/0063511 | A1* | 3/2006 | Shima | H04L 12/2805 455/410 |
| 2009/0254980 | A1* | 10/2009 | Kanaparti | H04L 12/2818 726/4 |
| 2012/0150950 | A1* | 6/2012 | Osann, Jr. | H04N 21/4122 709/203 |
| 2013/0142181 | A1* | 6/2013 | Makim | H04L 12/2818 370/338 |

* cited by examiner

Fig. 3

| TYPE OF COMMUNICATION NETWORK | OPERATION INSTRUCTION INFORMATION | | | |
|---|---|---|---|---|
| | . . . | . . . | . . . | . . . |
| LOCAL AREA NETWORK | ○ | ○ | × | ○ |
| WIDE AREA COMMUNICATION NETWORK | ○ | × | ○ | ○ |

Fig. 4

| OPERATION INSTRUCTION INFORMATION | REMOTE CONTROL SIGNAL |
|---|---|
| . . . | 110011001011 |
| . . . | 100101011011 |

Fig. 14

| CONTENTS OF SWITCHING OF COMMUNICATION NETWORK | OPERATION INSTRUCTION INFORMATION |
|---|---|
| LOCAL AREA → WIDE AREA | . . . |
| WIDE AREA → LOCAL AREA | . . . |

Fig. 17

| CONFLICTING OPERATION INSTRUCTION INFORMATION ||  EXCEPTION PROCESSING |
|---|---|---|
| OPERATION INSTRUCTION INFORMATION 1 | OPERATION INSTRUCTION INFORMATION 2 | |
| . . . | . . . | . . . |
| . . . | . . . | . . . |
| . . . | . . . | . . . |

Fig. 18

| DATE INFORMATION | TERMINAL ID | OPERATION INSTRUCTION INFORMATION | ROUTE COMMUNICATION NETWORK |
|---|---|---|---|
| 2011/04/25/13:25 | T0002 | ・・・ | WIDE AREA COMMUNICATION NETWORK |
| 2011/04/25/14:36 | T0005 | ・・・ | LOCAL AREA NETWORK |
| 2011/04/25/15:05 | T0001 | ・・・ | WIDE AREA COMMUNICATION NETWORK |

Fig. 23

| DATE INFORMATION | TERMINAL ID | AUDIO-VISUAL PROGRAM |
|---|---|---|
| 2011/04/25/13:25 | T0002 | ・・・ |
| 2011/04/25/14:36 | T0005 | ・・・ |
| 2011/04/25/15:05 | T0001 | ・・・ |

Fig. 24

| ATTRIBUTION | RECOMMEND DATA ||
| | PREOGRAM INFORMATION | REMOTE CONTROL SIGNAL |
|---|---|---|
| · · · | · · · | 1001011101 |
| · · · | · · · | 0100110110 |
| · · · | · · · | 1110011011 |

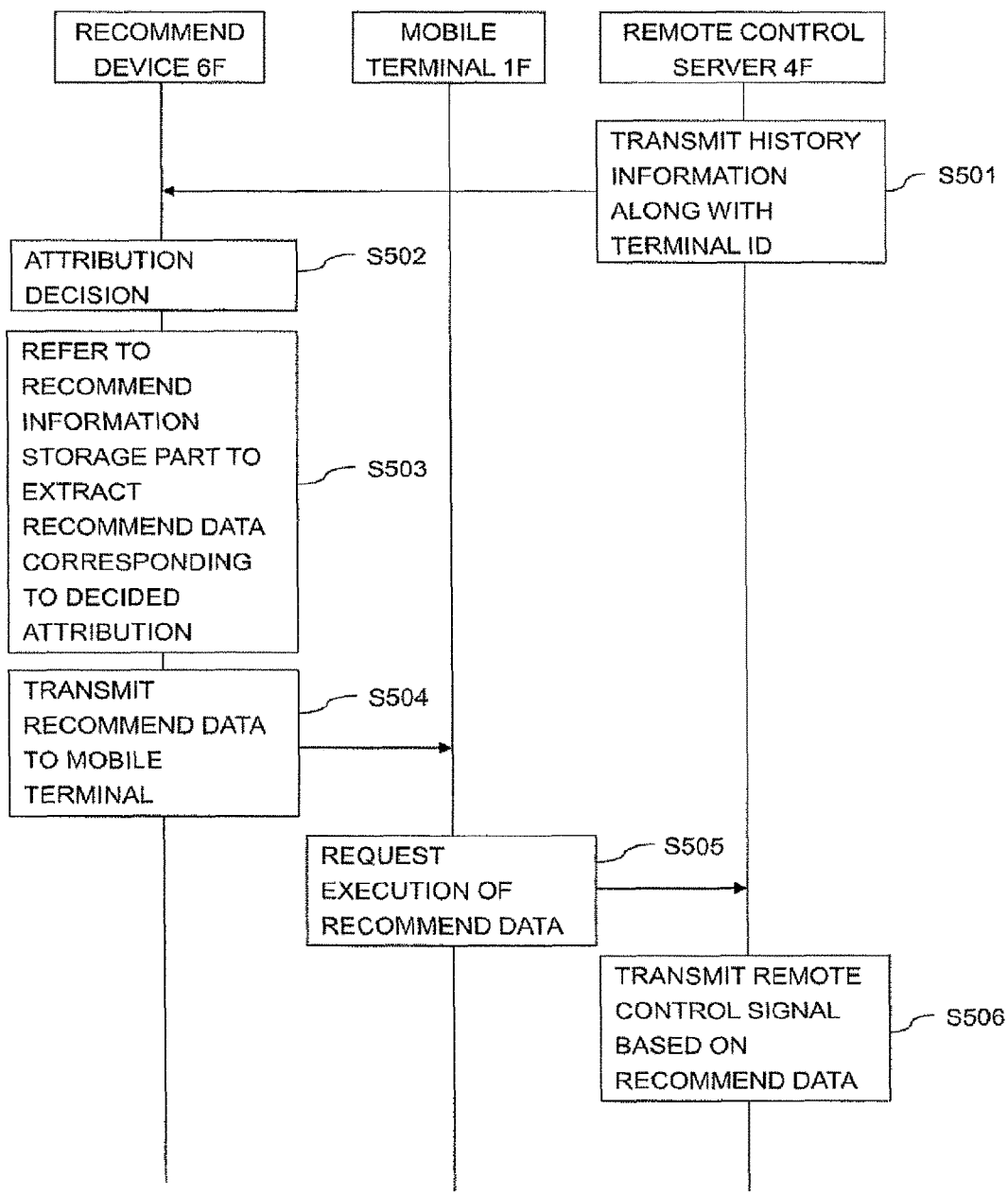

REMOTE CONTROL DEVICE, SERVER, METHOD, AND COMPUTER PROGRAM

CROSS-REFERENCE TO RELATED APPLICATIONS

This application is a continuation of application Ser. No. 14/860,649, filed on Sep. 21, 2015, which is a continuation of application Ser. No. 13/466,863, filed on May 8, 2012, which claims the benefit of Provisional Application Ser. No. 61/500,632, filed on Jun. 24, 2011. Application Ser. No. 13/466,863 also claims the benefit of Japanese Priority Application Serial No. 2011-104016, filed on May 9, 2011. All of the applications above are herein incorporated by reference.

FIELD OF THE INVENTION

The present invention relates to a technique to remotely control an operation object apparatus via a plurality of communication networks.

BACKGROUND OF THE INVENTION

A number of home electric appliances today are provided with a remote control device (remote controller) to allow operation at a distance from a user.

However, since each home electric appliance has its own remote controller, several controllers dedicated to a home electric appliance must be used, which is inconvenient.

Further, some users wish to manipulate the home electric appliance in their private homes when outside the home such that an air conditioner can be made to start in advance while outside of the home by a user in order to have a comfortable environment when reaching home.

On the other hand, at present, mobile terminals carrying an interface connectable with both a wide area communication network such as a cellular phone communication network and a local area network such as wireless LAN (Local Area Network) are provided. They have been wide spread and is becoming a main stream as a mobile terminal.

Under such a circumstance, Japanese Unexamined Patent Application Publication No. 2009-49654 discloses a handy server having a telephone conversation/communication function to connect with a telephone terminal or a site on the network via a cellular phone communication network or a wireless LAN network and a remote control function to communicate with a home electric appliance having a near-field wireless communication function to remotely control the home electric appliance.

Japanese Unexamined Patent Application Publication No. JP2007-116484 proposes a system in which a cellular phone obtains a remote control code of a home appliance manufacturer to be an operation object from a site via the Internet to transmit a command corresponding to the obtained remote control code to a remote control station. The remote control station converts the command into an infrared signal to operate the electric appliance to be an operation object.

Although the handy server of Japanese Unexamined Patent Application Publication No. 2009-49654 is connectable with a cellular phone communication network or a wireless LAN and includes a remote control function, connectivity with the cellular phone communication network or wireless LAN simply expands the width of available communication network.

In Japanese Unexamined Patent Application Publication No. JP2007-116484, a plurality of home electric appliances can be operated remotely by a single remote control station. However, at the time of simply executing a remote operation instruction received from a mobile terminal, no response can be possibly taken when dangerous conditions should occur in a home due to behavior of the home electric appliance by the operation. For example, when receiving an operation of a heater and the like from outside of the home to execute it, the occurrence of an unanticipated situation would be difficult to cope with if nobody is in the home.

The object of the present invention is, when receiving the operation instruction of an operation object apparatus from a terminal that a user utilizes, to discriminate the kind of a communication network in which the relevant terminal establishes communication and provide a technique to discriminate permission/rejection of the operation according to the kind.

SUMMARY OF THE INVENTION

In order to achieve the above object, a remote control terminal according to a first aspect of the present invention is configured to communicate with a remote control server via a particular local area network or a wide area communication network. The remote control server receives operation instruction information from a user. The operation instruction information instructs operation of an operation object apparatus. The remote control server transmits a remote control signal corresponding to the operation instruction information so as to operate the operation object apparatus. The remote control terminal is configured to receive an input of the operation instruction information from a user so as to remotely control the operation object apparatus via the remote control server. The remote control terminal comprises: a permission/rejection information storage unit configured to store whether execution of the remote control operation is permitted or rejected based on the operation instruction information when each operation instruction information goes through any communication network, the particular local area network or wide area communication network; an operation instruction information receiving unit configured to receive an input of operation instruction information by the user; a communication network discrimination unit configured to discriminate in which communication has been established, the particular local area network or wide area communication network; an operation permission/rejection decision unit configured to refer to the permission/rejection information storage unit according to the discrimination results to decide whether execution of the received operation instruction information is permitted or rejected; and an operation instruction information transmitting unit configured to transmit the received operation instruction information to the remote control server when remote control operation based on the operation instruction information is permitted as a result of the decision.

An operation object apparatus is an electronic apparatus such as an air conditioner and a television that is operable by a remote controller. The wide area communication network is, for example, a cellular phone communication network of a CDMA (Code Division Multiple Access) method. The local area network is a communication network such as a wireless LAN conforming to IEEE802.11, Bluetooth™, IrDA, Zigbee™, and specific small power radio.

Further, a remote control terminal according to another aspect of the present invention is configured to communicate with a remote control server via a particular local area network or a wide area communication network. The remote control server receives operation instruction information from a user. The operation instruction information instructs operation of an operation object apparatus. The remote control terminal transmits a remote control signal corresponding to the operation instruction information so as to operate the operation object apparatus. The remote control terminal is configured to receive an input of the operation instruction information from a user so as to remotely control the operation object apparatus via the remote control server. The remote control terminal comprises: a permission/rejection information storage unit configured to store whether execution of the remote control operation is required to be verified or not based on the operation instruction information when each operation instruction information goes through any communication network, the particular local area network or wide area communication network; an operation instruction information receiving unit configured to receive an input of operation instruction information by the user; a communication network discrimination unit configured to discriminate in which communication has been established, the particular local area network or wide area communication network; an operation permission/rejection decision unit configured to refer to the permission/rejection information storage unit according to the discrimination results to decide whether execution of the received operation instruction information is to be verified or not; an execution verification unit configured to display an execution verification dialog of the remote control operation when the remote control operation based on the operation instruction information is required to be verified as a result of the decision; and an operation instruction information transmitting unit configured to transmit the received operation instruction information to the remote control server when remote control operation based on the operation instruction information is permitted as a result of the execution verification.

The particular local area network may be formed by the particular relay device that transmits identification information. The remote control terminal further comprises: an identification information detection unit configured to detect identification information transmitted from a particular relay device. The particular local area network is formed by the particular relay device transmitting identification information; a communication establishment unit configured to establish communication with a particular local area network formed by the particular relay device when the identification information is detected and to establish communication with the wide area communication network when the identification information is not detected; and a communication conditions storage unit configured to store information on a kind of the established communication network. The communication network discrimination unit refers the communication conditions storage unit to discriminate with which communication has established, the particular local area network or wide area communication network.

Further, the remote control server according to another aspect of the present invention is configured to communicate with a remote control terminal via a particular local area network or a wide area communication network. The remote control terminal receives an input of operation instruction information from a user. The operation instruction information instructs operation of an operation object apparatus. The remote control terminal remotely controls the operation object apparatus. The remote control server is configured to transmit a remote control signal corresponding to the operation instruction information so as to operate the operation object apparatus. The remote control server comprises: a permission/rejection information storage unit configured to store whether execution of remote control operation is permitted or rejected based on the operation instruction information when each operation instruction information goes through any communication network, the particular local area network or the wide area communication network; an operation instruction information receiving unit configured to receive operation instruction information from the user terminal; a communication network discrimination unit configured to discriminate through which communication network the received operation instruction information has gone and been received, the particular local area network or the wide area communication network; an operation permission/rejection decision unit configured to refer to the permission/rejection information storage unit to decide permission/rejection of execution of the received operation instruction information according to the discrimination results; and a remote control signal transmitting unit configured to transmit a remote control signal based on the operation instruction information to the operation object apparatus when remote control operation based on the operation instruction information is permitted as a result of the decision.

The remote control server may be configured to communicate with a radio device that is associated with the remote control terminal in advance and registered via the particular local area network. The operation permission/rejection decision unit refers to the permission/rejection information storage unit to decide permission/rejection of execution of the operation instruction information assuming that the received operation instruction information has been received via the particular local area network when communication has been established with the radio apparatus via the particular local area network.

Further, the remote control method according to another aspect of the present invention is performed by a computer. The computer is configured to communicate with a remote control server via a particular local area network or a wide area communication network. The remote control server receives operation instruction information from a user. The operation instruction information instructs operation of an operation object apparatus. The remote control server transmits a remote control signal corresponding to the operation instruction information so as to operate the operation object apparatus. The computer includes a permission/rejection information storage unit configured to store whether execution of remote control operation based on the operation instruction information is permitted or rejected when each operation instruction information goes through any communication network, the particular local area network or the wide area communication network. The remote control method is configured to receive an input of the operation instruction information from a user so as to remotely control the operation object apparatus via the remote control server by the computer. The remote control method comprises the executions of: processing to receive an input of operation instruction information by the user; processing to discriminate with which communication has been established, the particular local area network or wide area communication network; processing to refer to the permission/rejection information storage unit according to the discrimination results and decide permission/rejection of execution of the received operation instruction information; and processing to transmit the received operation instruction information to the remote control server when remote control operation based on the operation instruction information is permitted as a result of the decision.

Further, the computer program according to another aspect of the present invention is performed by a computer. The computer is configured to communicate with a remote control server via a particular local area network or a wide area communication network. The remote control server receives operation instruction information from a user. The operation instruction information instructs operation of an operation object apparatus. The remote control server transmits a remote control signal corresponding to the operation instruction information so as to operate the operation object apparatus. The computer includes a permission/rejection information storage unit configured to store whether execution of remote control operation based on the operation instruction information is permitted or rejected when each operation instruction information goes through any communication network, the particular local area network or wide area communication network. The computer program is configured to cause the computer to function as a remote control apparatus that receives an input of the operation instruction information from a user and remotely controls the operation object apparatus via the remote control server. The computer program comprises the instructions of: processing to receive an input of operation instruction information by the user; processing to discriminate with which communication has been established, the particular local area network or wide area communication network; processing to refer to the permission/rejection information storage unit according to the discrimination results to decide permission/rejection of execution of the received operation instruction information; and processing to transmit the received operation instruction information to the remote control server when remote control operation based on the operation instruction information is permitted as a result of the decision.

According to the present invention, when receiving an instruction to operate an operation object apparatus from a terminal utilized by a user, the kind of a communication network in which the terminal establishes communication can be discriminated and permission/rejection of the operation can be discriminated according to the kind.

BRIEF DESCRIPTION OF DRAWINGS

FIG. 3 is a diagram illustrating an example of data stored in the permission/rejection information storage part of the present embodiment.

FIG. 4 is a diagram illustrating an example of data stored in the signal information storage part of the present embodiment.

FIG. 14 is an exemplary diagram of data stored in a switching information storage part of the present example.

FIG. 17 is an exemplary diagram of data stored in the conflicting information storage part of the present example.

FIG. 18 is an exemplary diagram of data stored in the history information storage part of the present example.

FIG. 23 is an exemplary diagram of data stored in a history information storage part in the present example.

FIG. 24 is an exemplary diagram of data stored in a recommend information storage part in the present example.

FIG. 25 is a sequence chart illustrating a processing flow for executing recommend based on history information in the present example.

DETAILED DESCRIPTION

Figure 1:
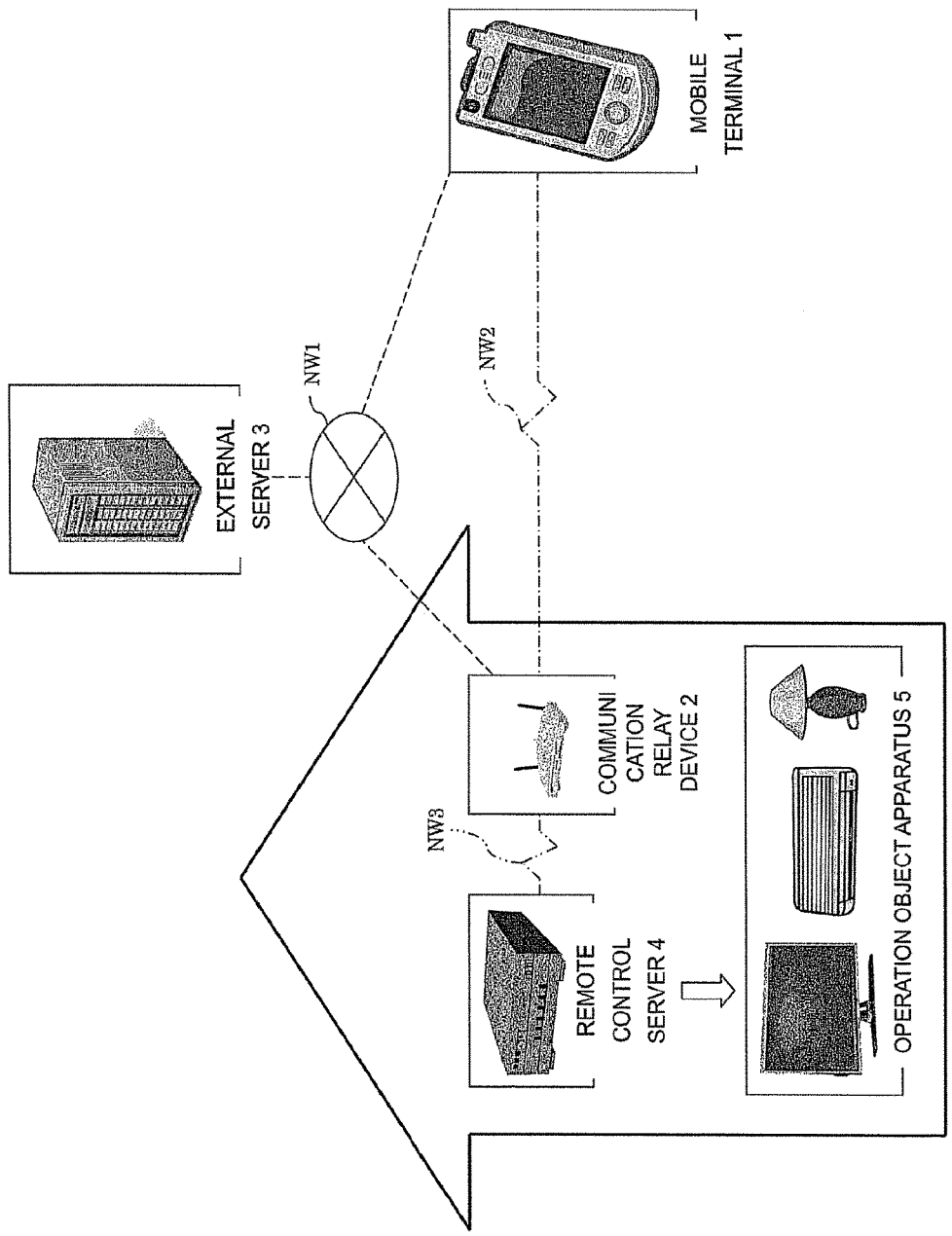
FIG. 1 is a schematic diagram of a remote control system of an embodiment of the present invention.

A remote control system according to the present embodiment includes a mobile terminal 1, a communication relay device 2, an external server 3, a remote control server 4, and an operation object apparatus 5 as shown in FIG. 1.

The mobile terminal 1 is a terminal that a user of the present system uses and is composed of a cellular phone, PDA (Personal Digital assistance) and the like.

The mobile terminal 1 establishes communication with a wide area communication network NW1 and a particular local area network NW2 to transmit operation instruction information to a remote control server 4.

Here, operation instruction information is information instructing the action of the operation object apparatus 5.

The wide area communication network NW1 is a public telecommunication network such as a cellular phone communication network and the Internet network. It is a relatively large-scaled communication network, allowing information transmission and reception between communication terminals located in a different building and a different area.

In addition, the communication with the wide area communication network NW1 of the present example includes that by way of the local area network other than a particular local area network NW2. That is, the particular local area network NW2 in the present example is a local area network to which a remote control server 4 formed by the communication relay device 2 is connected. In particular, in the present example, a wireless LAN network formed in a private home of a user where a remote control server 4 is installed can be assumed. Therefore, when the wide area communication network NW1 is utilized via the wireless LAN formed for unspecified public outside the home, it is regarded as communication with the wide area communication network NW1.

The local area network NW2 is a communication network whose scale is smaller than the wide area communication network such as wireless LAN and whose area is limited. Even when the area is large, the scale is not more than inside of one facility and allows information transmission and reception among communication terminals in the facility. When the local area network NW2 is connected with the wide area communication network NW1, information can be transmitted and received from the communication terminal connected with the local area network NW2 via the wide area communication network NW1 as well.

In addition, when referring to the local area network NW2 in the present embodiment, without notice in particular, a particular local area network formed by the communication relay device 2 and to which the remote control server 4 is connected is signified. Identification information configuring the local area network NW2 is registered in the mobile terminal 1. In the present example, in particular, wireless LAN formed in a private home of a user is supposed for the local area network NW2.

The communication relay device 2 is a wireless LAN router and forms a local area network NW2 to play a part as an access point.

The external server 3 is a server that is to play a role to convey operation instruction information when a mobile terminal 1 transmits operation instruction information to a remote control server 4 via a wide area communication network NW1. It is a proxy server and the like, for example.

Further, in the present embodiment, when the mobile terminal 1 directly accesses the remote control server 4 via a local area network NW2, the external server 3 becomes not necessary.

The remote control server 4 is a device that receives operation instruction information from the mobile terminal 1 and transmits a remote control signal based on the operation instruction to an operation object apparatus 5 to operate it.

The communication relay device 2 and remote control server 4 may be integrally configured. In that case, data transmission and reception between the communication relay device 2 and remote control server 4 does not depend on the local area network NW2.

The operation object apparatus 5 is an electronic apparatus that receives a remote control signal from the remote control server 4 to execute an action according to the remote control signal, being a home electric appliance such as a television and an air conditioner.

In the remote control system configured above, a user having the mobile terminal 1 transmits operation instruction information from the mobile terminal 1 to the remote control server 4. The operation instruction information is transmitted to the remote control server 4 via the local area network NW2 when the mobile terminal 1 can establish communication with the local area network NW2, and via the wide area communication network NW1 when the mobile terminal 1 cannot establish communication with the local area network NW2 but can establish it with the wide area communication network NW1.

The remote control server 4 having received operation instruction information from the mobile terminal 1 via the wide area communication network NW1 or local area network NW2 transmits a remote control signal corresponding to the operation instruction information to an operation object apparatus 5.

As a result, the operation object apparatus 5 is operated according to the Instruction of the user.

Embodiment 1

Descriptions are given to the remote control system according to Embodiment 1 of the present invention.

Figure 2:
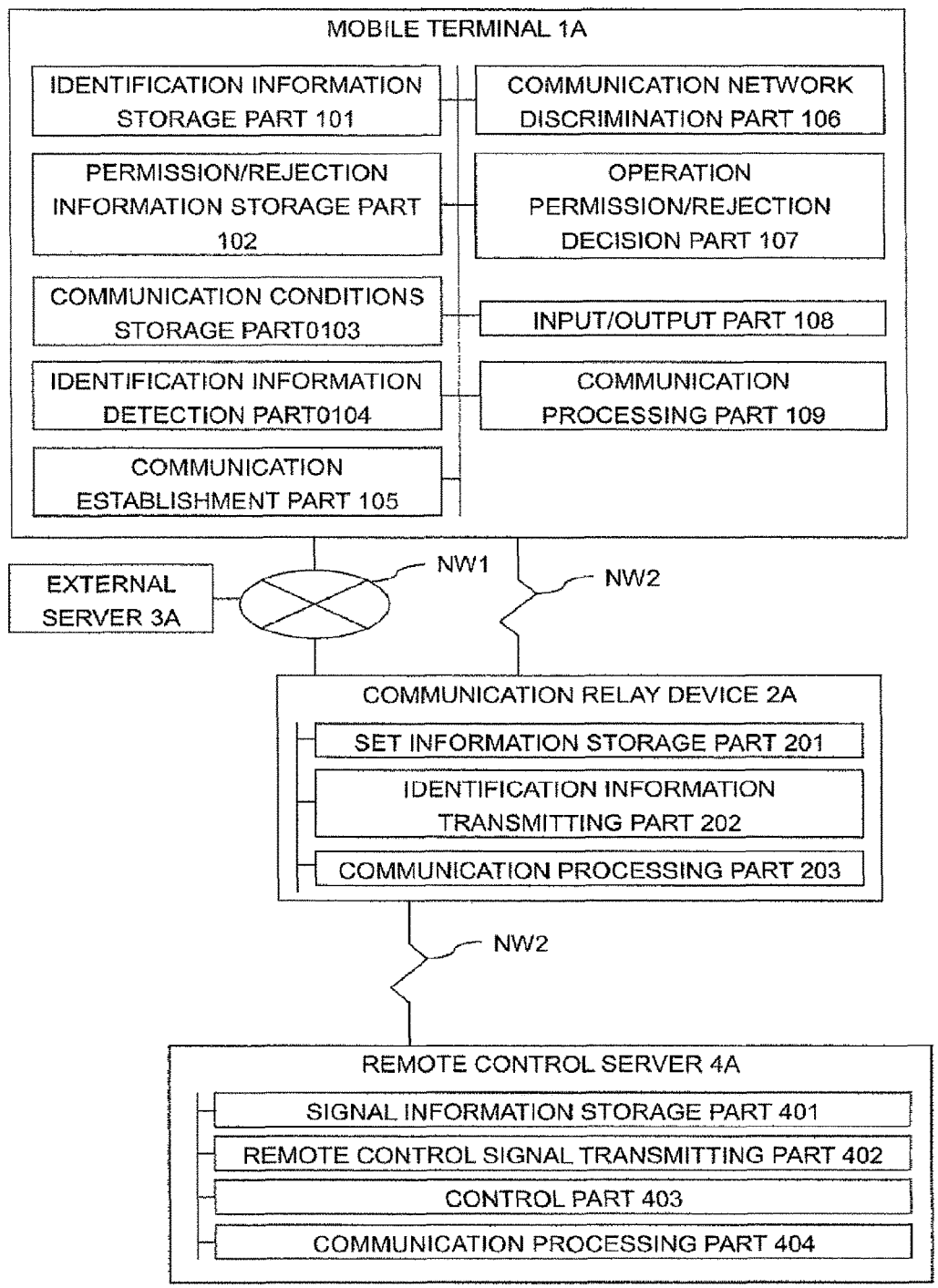
FIG. 2 is a function block diagram illustrating functions provided with the remote control system of the present embodiment.

As shown in FIG. 2, the remote control system of Embodiment 1 includes a mobile terminal 1A, a communication relay device 2A, an external server 3A, and a remote control server 4A.

In Embodiment 1, execution of the operation requested by the user is permitted or rejected according to via which operation instruction information is transmitted from the mobile terminal 1A to the remote control server 4A, the wide area communication network NW1 or local area network NW2.

In a concrete applicable case of Embodiment 1, the local area network NW2 is a communication network such as wireless LAN formed in a private home of a user. When the mobile terminal 1A is communicable with both the wide area communication network NW1 and local area network NW2, the local area network NW2 is preferentially utilized. When the mobile terminal 1A is communicable with the local area network NW2, the user having the mobile terminal 1A is assumed to be at home. On the other hand, when the mobile terminal 1A is communicable only with the wide area communication network NW1, the user is assumed to be not at home.

Under such assumption, permission/rejection of execution of operation instruction information from the user is determined according to the kind of the communication networks NW1 and NW2 in which the mobile terminal 1A has established communication. As a result, processing can be achieved such that when the user is assumed to be at home, switching operation of a heater is allowed. On the other hand, when the user is not at home, it is rejected.

A mobile terminal 1A is constituted by, what is called, a cellular phone, PDA (Personal Digital Assistance) and the like and includes functional blocks comprising an identification information storage part 101, a permission/rejection information storage part 102, a communication conditions storage part 103, an identification information detection part 104, a communication establishment part 105, a communication network discrimination part 106, an operation permission/rejection decision part 107, an input/output part 108, and a communication processing part 109.

The identification information storage part 101 is a storage part that stores identifiable identification information of the communication relay device 2A. The identification information is, for example, an SSID (Service Set Identifier), a MAC address (Media Access Control address) and the like, being transmitted from the communication relay device 2A.

In addition, the stored identification information here is the identification information of a particular communication relay device 2A that forms the local area network NW2. By referring to the identification information stored in the identification information storage part 101, the local area network NW2 formed by the particular communication relay device 2A can be identified.

The permission/rejection information storage part 102 is a storage part that stores information on permission/rejection of execution of operation instruction information specified by the user according to the kind of the communication network in which the mobile terminal 1A has established communication.

In the permission/rejection information storage part 102, information on whether execution is permitted or not according to the kind of the communication network, the wide area communication network NW1 or local area network NW2, is associated and stored for each operation instruction information as shown in FIG. 3.

The communication conditions storage part 103 is a storage part that can store communication conditions of the mobile terminal 1 such that with which communication network the mobile terminal 1 has established communication, the wide area communication network NW1 or local area network NW2, or the mobile terminal 1 has established no communication with neither communication network.

The communication conditions stored in the communication conditions storage part 103 are registered and updated according to establishment of communication by the communication establishment part 105.

The identification information detection part 104 detects identification information transmitted from the communication relay device 2A. In addition, the identification information detection part 104 can detect not only the identification information transmitted from the particular communication relay device 2A but also the identification information transmitted from a communication relay device set for other unspecified public.

The communication establishment part 105 executes processing to establish communication with the wide area communication network NW1 and local area network NW2.

The communication network discrimination part 106 discriminates the kind of the communication network in which the mobile terminal 1 currently establishes communication. Specifically, the communication network discrimination part 106 discriminates which communication network has been established communication, the wide area communication network NW1 or local area network NW2.

The operation permission/rejection decision part 107 refers to the permission/rejection information storage part 102 according to results of discrimination by the communication network discrimination part 106 to execute processing to decide permission/rejection of execution of operation instruction information input by the user.

The input/output part 108 is a processing part for executing data input/output, being achieved by a display or a speaker for outputting data, a mouse or a keyboard for inputting data, and the like.

In addition, the input/output part 108 may be composed of a touch panel. In that case, a function may be provided to be set in such a way that continuous touching at a particular portion (a button or the like) for a certain time is necessary for action in consideration of use by disabled people.

Usually, a little touching on the screen causes an immediate reaction to occur, which will be a cause of false operation for those who find it difficult to voluntarily act. The false operation can be avoided by making the input/output part 108 not to operate without conscious touching for a certain time.

The communication processing part 109 is a processing part that executes transmission/reception processing of data to/from the remote control server 4A according to predetermined protocol via the wide area communication network NW1 and local area network NW2, being achieved by a Web browser and the like.

The communication relay device 2A forms the local area network NW2 to function as its access point and has an interface to connect to the wide area communication network NW1, which is achieved by a wireless LAN router in this present example.

The communication relay device 2A includes respective function parts of set information storage part 201, identification information transmitting part 202, and communication processing part 203.

The set information storage part 201 is a storage part that stores information on setting of the communication relay device 2A. In the set information storage part 201, an SSID, a MAC address and the like are stored as identification information that identifies the communication relay device 2A.

The identification information transmitting part 202 is a function part that transmits identifiable identification information of the communication relay device 2A by radio.

The communication processing part 203 relays transmission/reception of data by the mobile terminal 1A and remote control server 4A.

The external server 3A leads transmission of data when the mobile terminal 1A transmits data to the remote control server 4A via the wide area communication network NW1, and conversely the remote control server 4A transmits data to the mobile terminal 1A via the wide area communication network NW1, being achieved by a proxy server, for example.

The remote control server 4A is a device that not only receives operation instruction information from the mobile terminal 1A to an operation object apparatus 5 but also transmits a remote control signal corresponding to the operation instruction information to the operation object apparatus 5 to operate the same.

The remote control server 4A constitutes a function block made of a signal information storage part 401, a remote control signal transmitting part 402, a control part 403, and a communication processing part 404 by an arithmetic device such as a CPU (Central Processing Unit) and a storage device such as a RAM (Random Access Memory) and a ROM (Read Only Memory).

The signal information storage part 401 is a storage part that stores a remote control signal according to operation instruction information from a user.

In the signal information storage part 401, for example as shown in FIG. 4, operation instruction information transmitted from the mobile terminal 1A and the corresponding remote control signal are associated to each other to be stored.

Here, the operation instruction information is the information related to the action of the operation object apparatus 5 representing an action such as ON/OFF of the power source of the operation object apparatus 5.

Further, the remote control signal is a light emitting pattern of a signal such as an infra-red ray and a narrow-band communication signal such as Bluetooth™, being a signal in need of execution of the operation instruction information. In addition, the remote control server 4A and operation object apparatus 5 may be connected so as to directly transmit/receive the remote control signal.

The remote control signal transmitting part 402 transmits a remote control signal instructed by the control part 403 to the operation object apparatus 5.

When receiving operation instruction information from the mobile terminal 1A, the control part 403 refers to the signal information storage part 401 to identify the remote control signal corresponding to the operation instruction information. Then, the control part 403 controls the remote control signal transmitting part 402 to transmit the identified remote control signal to the operation object apparatus 5.

The communication processing part 404 executes the transmission/reception processing of data with the mobile terminal 1A via the communication relay device 2A.

Next, descriptions are given to a processing flow by the remote control system of Embodiment 1.

Figure 5:
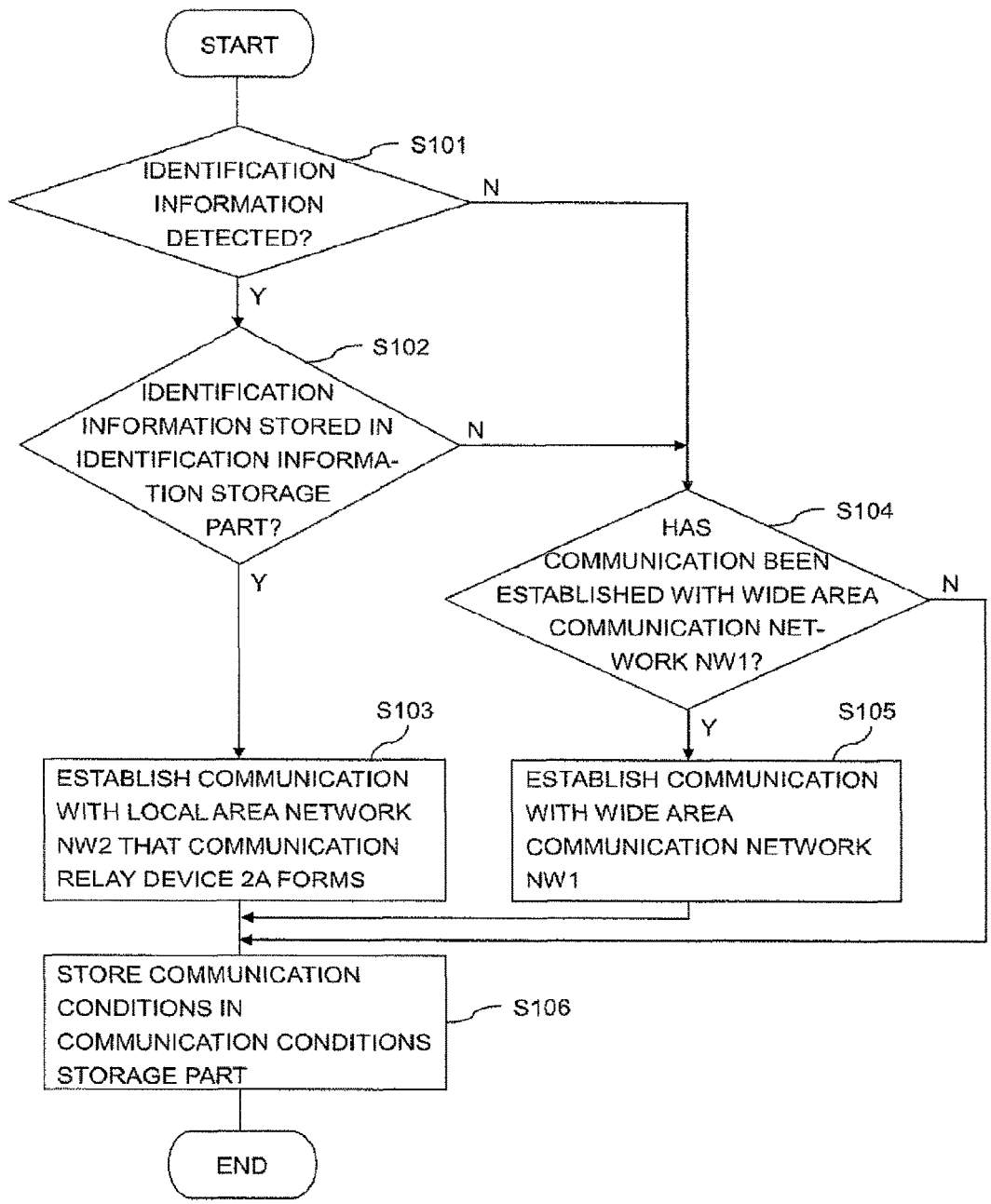
FIG. 5 is a processing flowchart illustrating a processing flow for establishing communication with a communication network in the remote control system of the present embodiment.

At first, refer to FIG. 5, and at a previous stage where the mobile terminal 1A transmits operation instruction information to the remote control server 4A, for example, when starting an application for executing an operation instruction in the mobile terminal 1A, the flow for establishing communication with the wide area communication network NW1 or local area network NW2 is explained.

The mobile terminal 1A tries to detect identification information transmitted by the communication relay device 2A through the identification information detection part 104 (S101).

As a result, when the identification information can be detected, refer to the identification information storage part 101 to discriminate whether the identification information belongs to the communication relay device 2A or not (S102).

Resultantly, when the detected identification information is discriminated to belong to the communication relay device 2A, the communication establishment part 105 establishes communication with the local area network NW2 formed by the communication relay device 2A (S103).

On the other hand, as a result of processing by S101, when identification information failed to be detected or as a result of processing by S102, the detected identification information is not the information stored in the identification information storage part 101 (the detected identification information is not the information stored in the communication relay device 2A), the communication establishment part 105 tries to establish communication with the wide area communication network NW1 (S104). When possible, communication with the wide area communication network NW1 is established (S105).

In addition, establishment of communication with the wide area communication network NW1 includes those via a local area network such as the local area network for unspecified public that is different from the local area network NW2 formed by the communication relay device 2A.

After the completion of the above processing, established communication conditions are registered in the communication conditions storage part 103 (S106). When communication has not been established, inability of establishment may be registered as a communication condition.

Accordingly, communication is established and communication conditions are stored in the communication conditions storage part 103.

Further, when a predetermined time has elapsed, communication conditions may be updated by polling as needed.

Communication may be re-established and the communication conditions storage part 103 may be updated by executing the above processing again according to changes in situation such as at the time of detecting identification information from the communication relay device 2A while communication with the wide area communication network NW1 has been established and when communication with the local area network NW2 is broken while communication with the local area network NW2 has been established.

Figure 6:
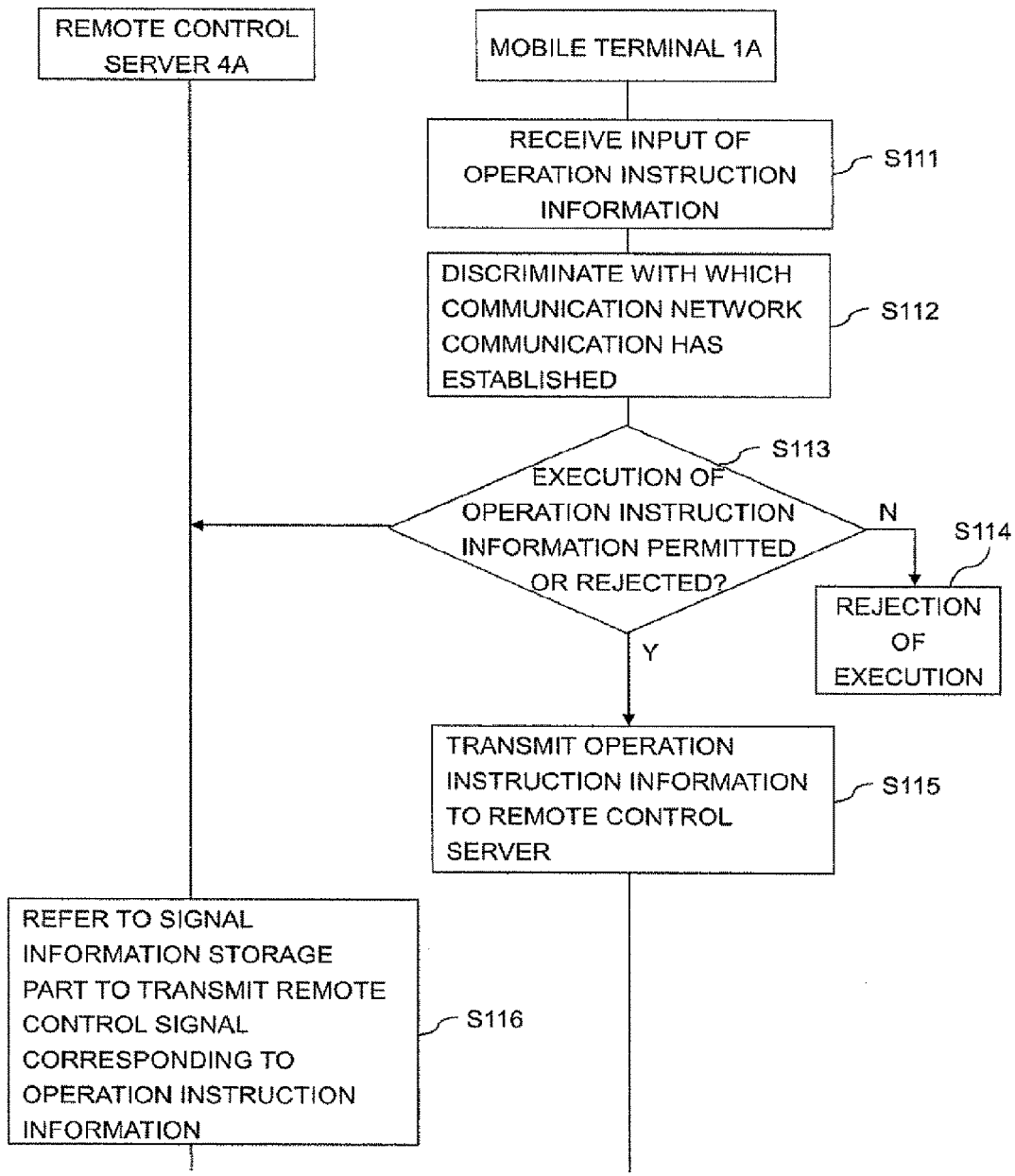
FIG. 6 is a sequence chart illustrating a processing flow for executing operation related to operation instruction information in the remote control system of the present embodiment.

Next, descriptions are given to processing in which operation instruction information is transmitted from the mobile terminal 1A to the remote control server 4A by referring to FIG. 6.

When the user inputs operation instruction information to the mobile terminal 1A (S111), the communication network discrimination part 106 refers to the communication conditions storage part 103 to discriminate the kind of the communicate network in which communication has established (S112).

Then, the operation permission/rejection decision part 107 decides whether execution of operation related to operation instruction information input by the user is permitted or rejected according to the kind of the discriminated communication network (S113).

The processing is executed by identifying whether execution of operation related to operation instruction information input via the discriminated communication network is permitted in advance or rejected while referring to the permission/rejection information storage part 102.

As a result, when execution is not permitted, an error message is output on the mobile terminal 1A and execution of the operation related to the requested operation instruction information is rejected (S114).

On the other hand, as a result of permission/rejection decision by S113, when execution of operation related to the operation instruction information input by the user is permitted, operation instruction information is transmitted to the remote control server 4A (S115).

In the remote control server 4A that has received operation instruction information, the control part 403 refers to the signal information storage part 401 to extract the remote control signal corresponding to the operation instruction information and controls the remote control signal transmitting part 402 to make it transmit the remote control signal (S116).

In addition, in Embodiment 1, although execution of the operation instruction information is permitted or rejected according to the kind of the communication network, it is not limited thereto. According to the kind of the communication network, an execution confirmation dialogue may be displayed by the input/output part 108.

In this case, in the permission/rejection information storage part 102, information on whether the execution confirmation dialogue is displayed or not according to the kind of the communication network of the wide area communication network NW1 or local area network NW2 is associated and stored for each operation instruction information. Then, at the time of receiving operation instruction information from the mobile terminal 1A, when the operation instruction information needs execution confirmation according to the kind of the communication network, the execution confirmation dialogue is displayed. When confirmed that there is no problem, the received operation instruction information is transmitted to the remote control server 4A. When the received operation instruction information needs no execution confirmation, the operation instruction information is transmitted to the remote control server 4A with no execution confirmation.

In Embodiment 1, although as an example of identifying the communication relay device 2A or the local area network NW2 that is formed by the communication relay device 2A, an example using the SSID and MAC address of the communication relay device 2A is cited, it is not limited thereto. The communication relay device 2A or the local area network NW2 that is formed by the communication relay device 2A may be identified by other data such as the frequency of radio.

In addition, the communication relay device 2A and remote control server 4A may be integrally configured.

Embodiment 2

In Embodiment 1, although a mobile terminal 1A side decided the kind of the communication network and permission/rejection of execution of operation related to operation instruction information based thereon, a remote control server 4A side may decide them.

Figure 7:
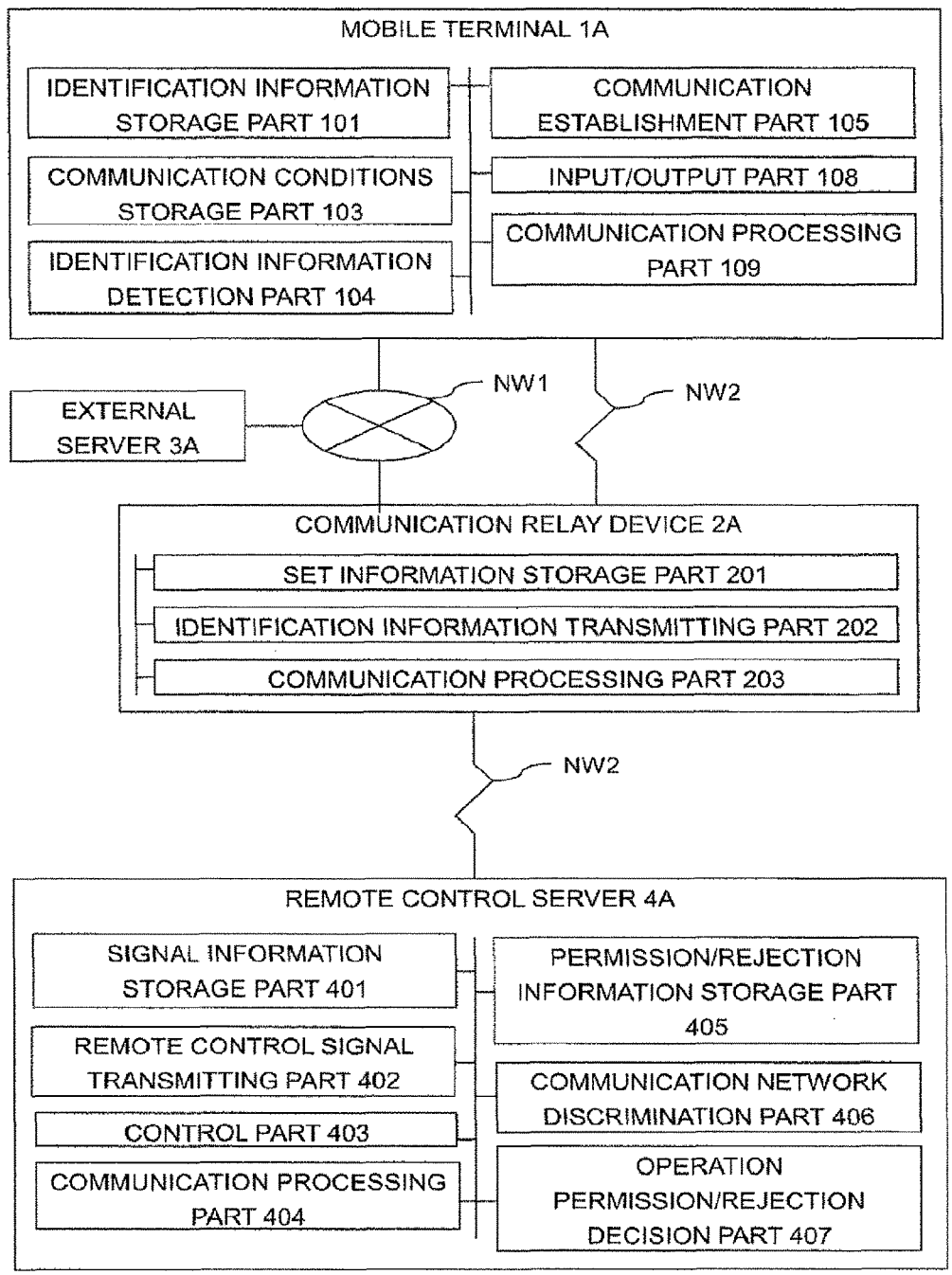
FIG. 7 is a function block diagram illustrating functions provided with the remote control system of another embodiment of the present invention.

FIG. 7 shows an example of a device configuration of this case.

In this example, the remote control server 4A includes the permission/rejection information storage part 405, communication network discrimination part 406, and operation permission/rejection decision part 407 corresponding to respective function parts of the permission/rejection information storage part 102, communication network discrimination part 106, and operation permission/rejection decision part 107 provided by the mobile terminal 1A in the above.

The communication network discrimination part 406 discriminates which communication network the operation instruction information received from the mobile terminal 1A has gone through.

The discrimination may be performed by various methods and is not limited in particular. For example, by obtaining the IP address of the external server 3 at the time of connecting to the wide area communication network NW1 and verifying with the registered IP address in advance, the communication network can be discriminated to be the wide area communication network NW 1 or local network NW2.

The permission/rejection information storage part 405 is a storage part related to permission/rejection of execution of the operation instruction information specified by the user according to the kind (the kind of the communication network through which the received operation instruction information has gone) of the communication network in which the mobile terminal 1A has established communication like the permission/rejection information storage part 102.

In addition, the operation permission/rejection decision part 407 refers to the permission/rejection information storage part 405 according to discrimination results by the communication network discrimination part 406 to execute processing to decide permission/rejection of execution of the operation instruction information input by the user like the operation permission/rejection decision storage part 107.

Figure 8:
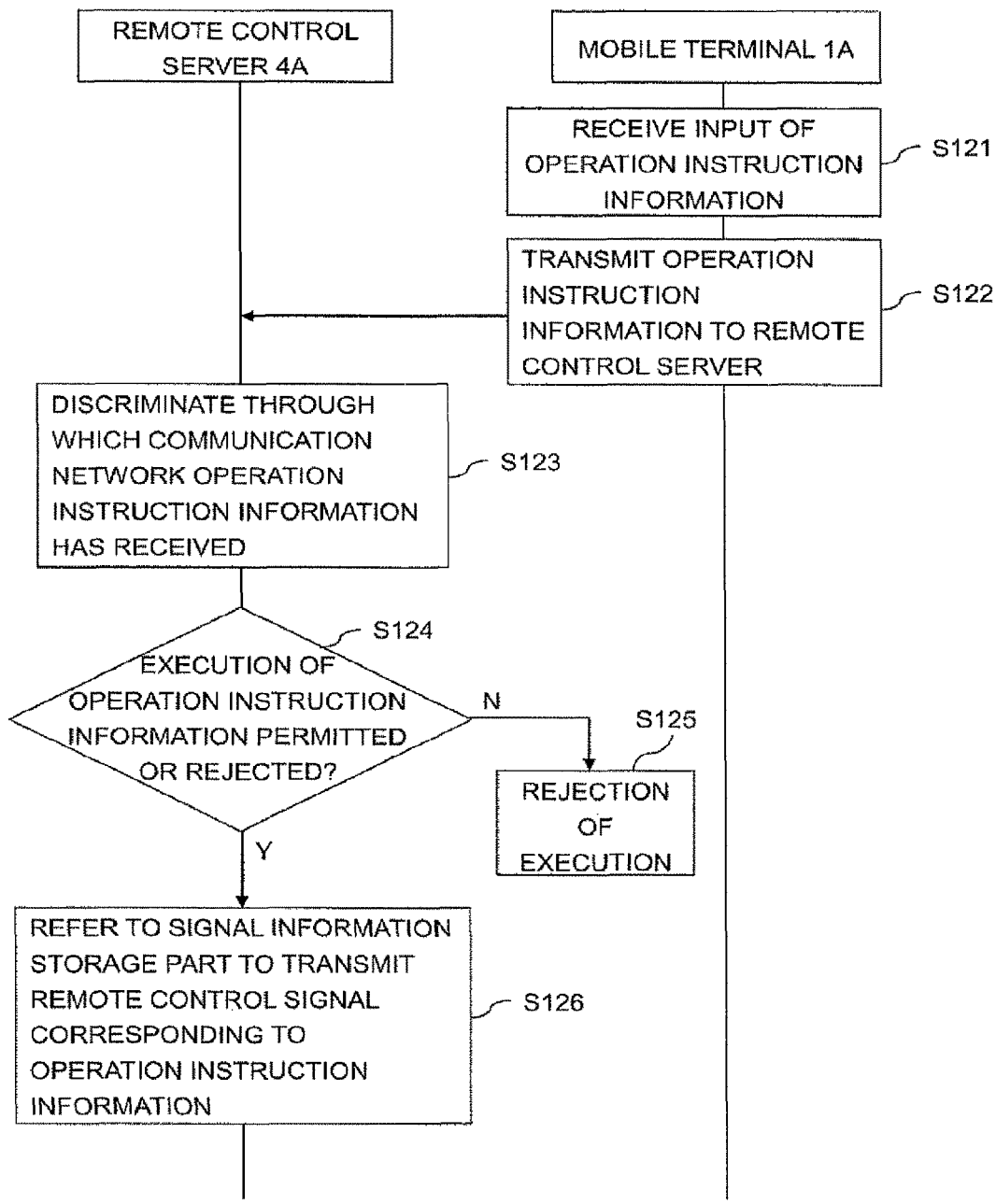
FIG. 8 is a sequence chart illustrating a processing flow for executing operation related to operation instruction information in the remote control system of the present embodiment.

FIG. 8 shows a processing flow until the operation related to operation instruction information is executed when the remote control server 4A has the above configuration.

At first, when operation instruction information is input to the mobile terminal 1A (S121), the operation instruction information is transmitted to the remote control server 4A (S122).

The remote control server 4A that has received the operation instruction information discriminates through which communication network operation instruction information has gone by the communication network discrimination part 406 (S123).

Based on the discrimination results, the operation permission/rejection decision part 407 refers to the permission/rejection information storage part 405 to decide whether execution of the operation related to the received operation instruction information is permitted or rejected (S124).

Resultantly, when execution is not permitted, an error message is transmitted to the mobile terminal 1A and execution of the operation related to the requested operation instruction information is rejected (S125).

On the other hand, as a result of permission/rejection decision by S124, when execution of the operation related to the operation instruction information input by the user is permitted, the control part 403 refers to the signal information storage part 401 to extract a remote control signal corresponding to the operation instruction information. At the same time, the control part 403 controls the remote control signal transmitting part 402 to transmit the remote control signal (S126).

In addition, in Embodiment 2, when transmitting operation instruction information from the mobile terminal 1A to the remote control server 4A, discrimination of the kind of the communication network to be gone through may be conducted by the mobile terminal 1A side, Information related to the discrimination results is transmitted to the remote control server 4A along with operation instruction information, and the remote control server 4A side may only permit or reject execution of operation related to the operation instruction information.

Further, in this case, the mobile terminal side may discriminate connection conditions of communication and by accessing the remote control server 4A with a different domain name according to connection conditions, the remote control server 4A side may decide the kind of the communication network based on the domain name.

Embodiment 3

In Embodiments 1 and 2, although the mobile terminals 1A and 1B have transmitted/received data to/from the remote control servers 4A and 4B via the local area networks NW1 and NW2 formed by the communication relay devices 1A and 2, the mobile terminal and remote control server can transmit and receive data via the local area network such as Bluetooth in Embodiment 3.

Embodiment 3 shows a case that is configured as a variation sample of Embodiment 2.

Figure 9:
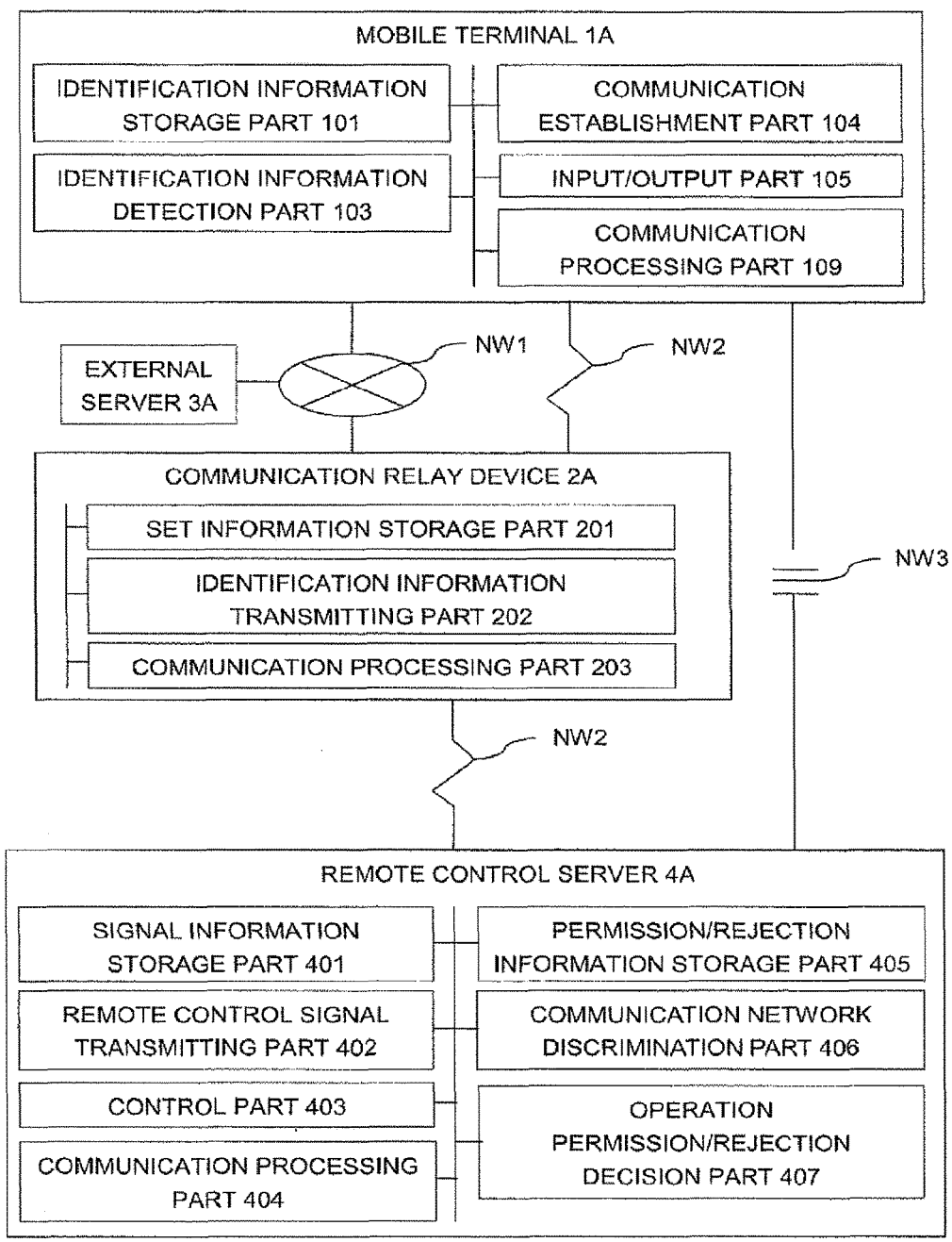
FIG. 9 is a function block diagram illustrating functions provided with the remote control system of another embodiment of the present invention.

FIG. 9 shows an example of a device configuration of that case.

In this example, the remote control server 4A is configured to be capable of performing data communication with the mobile terminal 1A by a local area network NW3. The local area network NW3, here, is assumed to be not only Bluetooth, IrDA, Zigbee and the like but also a particular small power radio.

Although the function parts provided by the mobile terminal 1A and remote control server 4A are the same as those of Embodiment 2, when the communication network discrimination part 406 is connected with the mobile terminal 1A via the local area network NW3 by pairing and the like, the operation instruction information received from the mobile terminal 1A is discriminated to be received via the local area network NW3. Permission/rejection execution of the operation related to operation instruction information received via the local area network NW3 is processed conforming to the case in which operation instruction information is received via the local area network NW2.

Figure 10:
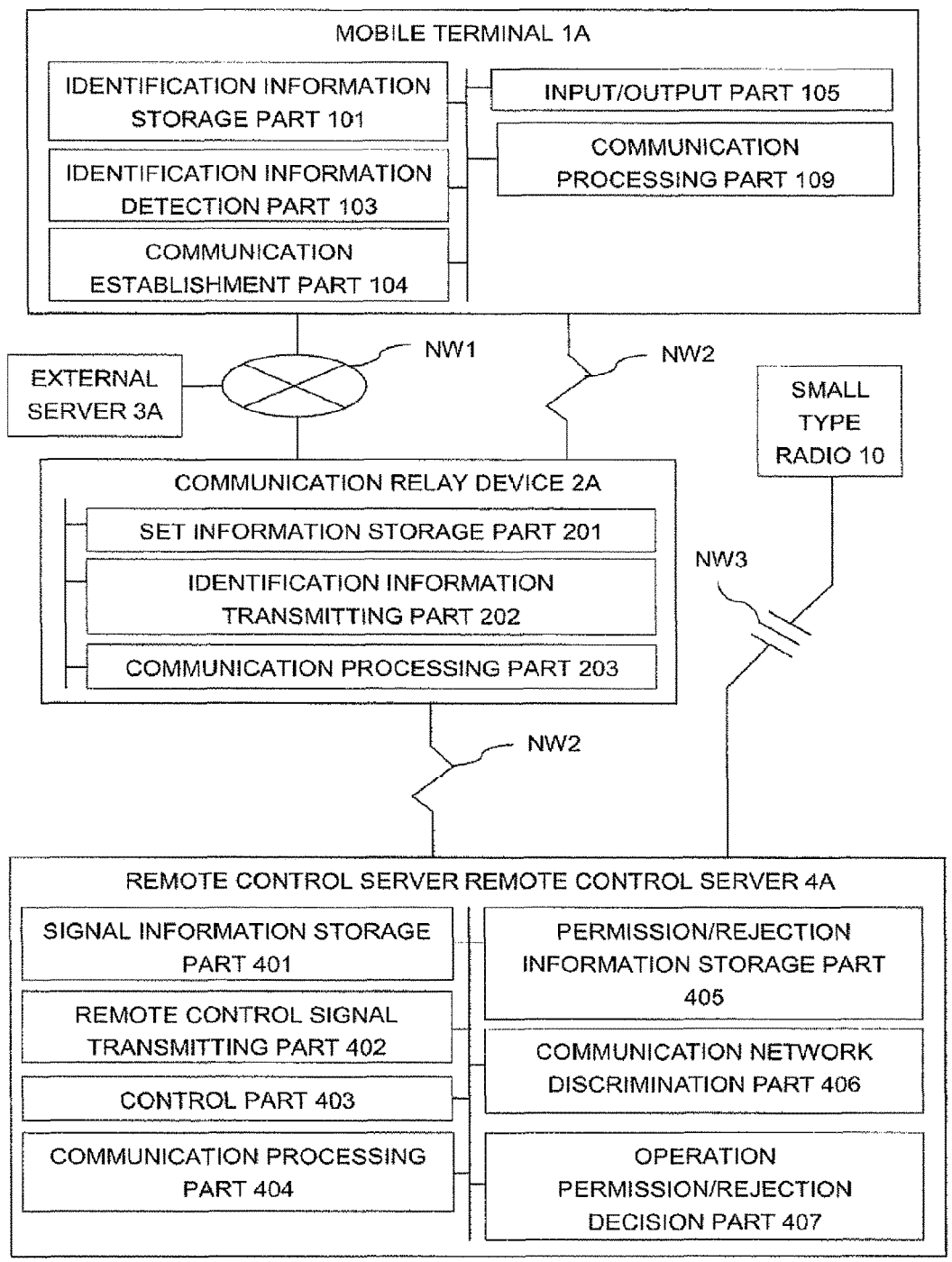
FIG. 10 is a function block diagram illustrating functions provided with the remote control system of another embodiment of the present invention.

As a variation example of Embodiment 3, a system may be constructed that includes a small type radio 10 connected with the remote control server 4A via the local area network NW3 such as the above Bluetooth, IrDA, Zigbee apart from the mobile terminal 1A as shown in FIG. 10.

In this example, the small type radio 10 is used for discriminating the location of the user of the mobile terminal 1A according to the kind of the communication network to be connected and the mobile terminal 1A is used to transmit operation instruction information to the remote control server 4.

In this example, identification information for identifying the mobile terminal 1A is stored in a transmittable and receivable fashion in the small type radio 10. The identification information and mobile terminal 1A are associated and stored in the remote control server 4A.

In the decision of permission/rejection of operation and processing of execution of operation based on the operation instruction information from the user, the operation instruction information to the remote control server 4A is transmitted from the mobile terminal 1A and permission/rejection of executing the operation related to operation instruction information is decided by the operation permission/rejection decision part 407. Then in the decision processing by the operation permission/rejection decision part 407, when the small type radio 10 and remote control server 4A are connected via the local area network NW3, permission/rejection of execution of operation of operation instruction information is decided assuming that the operation instruction information has been transmitted to the remote control server 4A via the local area networks NW2 and NW3 irrespective of through which communication network has the operation instruction information been transmitted.

In this example, for example, when the small type radio 10 is installed in a key holder and the like, users can always easily carry it and it is convenient because whether the user is at home or not can be discriminated only by the small type radio 10.

In addition, the relay device 2A may be made to have a function part that deploys the local area network NW3 and the small type radio 10 may communicate with the relay device 2A via the local area network NW3 deployed by the relay device 2A.

Reference Example 1

In another example, an operation screen may be deployed on the mobile terminal 1 according to the kind of the communication network in which the mobile terminal 1 has established communication.

Figure 11:
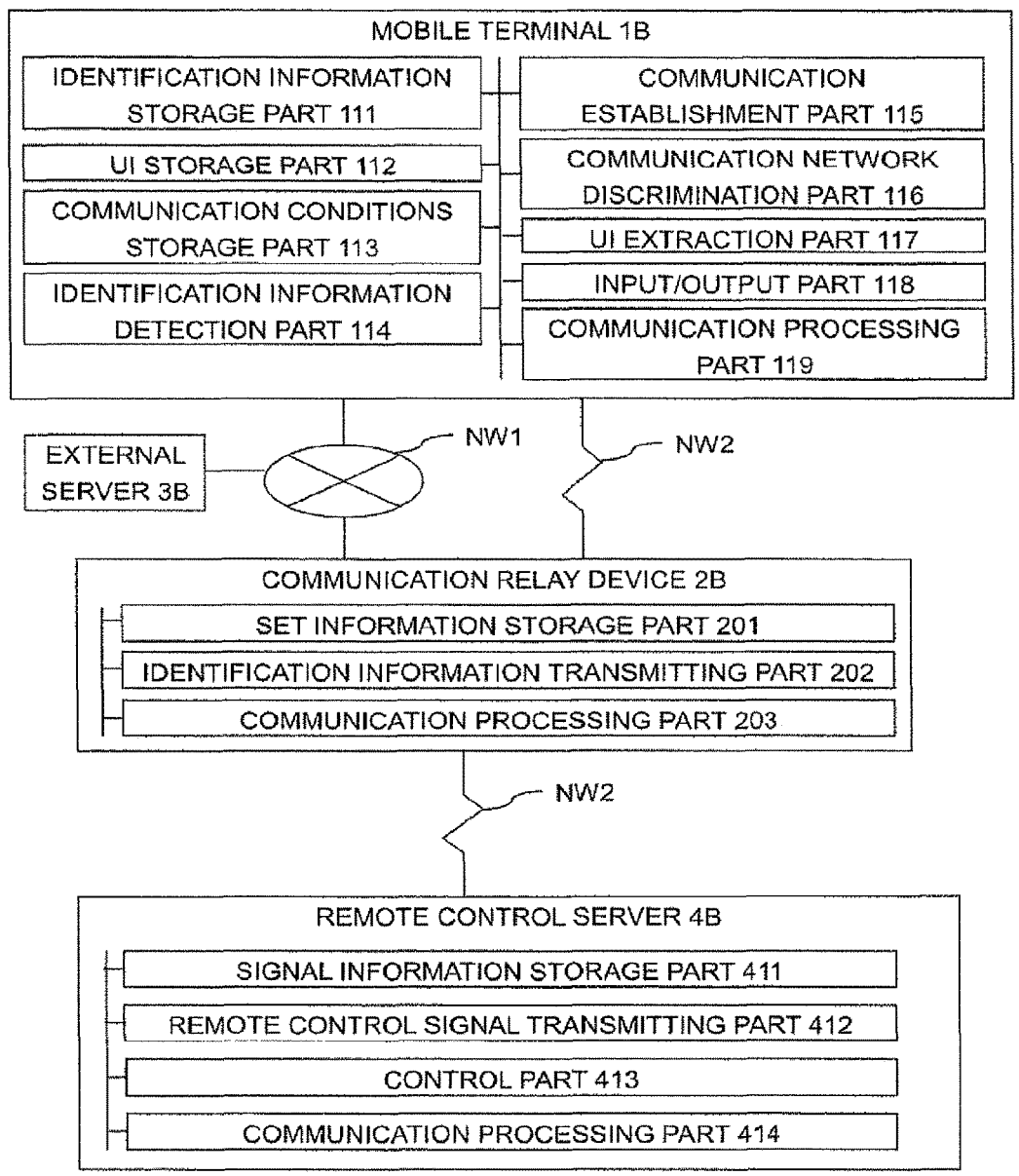
FIG. 11 is a function block diagram illustrating functions provided with each terminal or device in a reference example of the present invention.

FIG. 11 shows an example of configuration of each terminal or device. In addition, FIG. 11 shows a minimum configuration of the present example and functions in other examples may be added as needed.

The mobile terminal 1B is configured by, what is called, a cellular phone, a PDA (Personal Digital Assistance) and the like in the same way as the above-mentioned mobile terminal 1A, including a function block composed of an identification information storage part 111, a UI storage part 112, a communication conditions storage part 113, an identification information detection part 114, a communication establishment part 115, a communication network discrimination part 116, a UI extraction part 117, an input/output part 118, and a communication processing part 119.

In addition, respective functions of the identification information storage part 111, the communication conditions storage part 113, the identification information detection part 114, the communication establishment part 115, the communication network discrimination part 116, the input/output part 118, and the communication processing part 119 are the same as those of the identification information storage part 101, the communication conditions storage part 103, the identification information detection part 104, the communication establishment part 105, the communication network discrimination part 106, the input/output part 108, and the communication processing part 109, respectively.

Respective configurations of a communication relay device 2B, an external server 3B, and a remote control server 4B are the same as those of the above mentioned communication relay device 2A, external server 3A, and remote control server 4A, respectively.

The UI storage part 112 is a storage part that stores a UI corresponding to the kind of the communication network in which the mobile terminal 1B has established communication.

The UI (user interface) stored in the UI storage part 112 is made, for example, only of a button that instructs operation instruction information permitted according to the kind of the communication network. When communication has been established with the wide area communication network NW1, with the UI prepared for the wide area communication network NW1, the button provided for requesting all operation instruction information is executable.

The UI extraction part 117 extracts the UI according to the kind of the communication network from the UI storage part 112 as a result of discrimination of the communication network by the communication network discrimination part 116.

Figure 12:
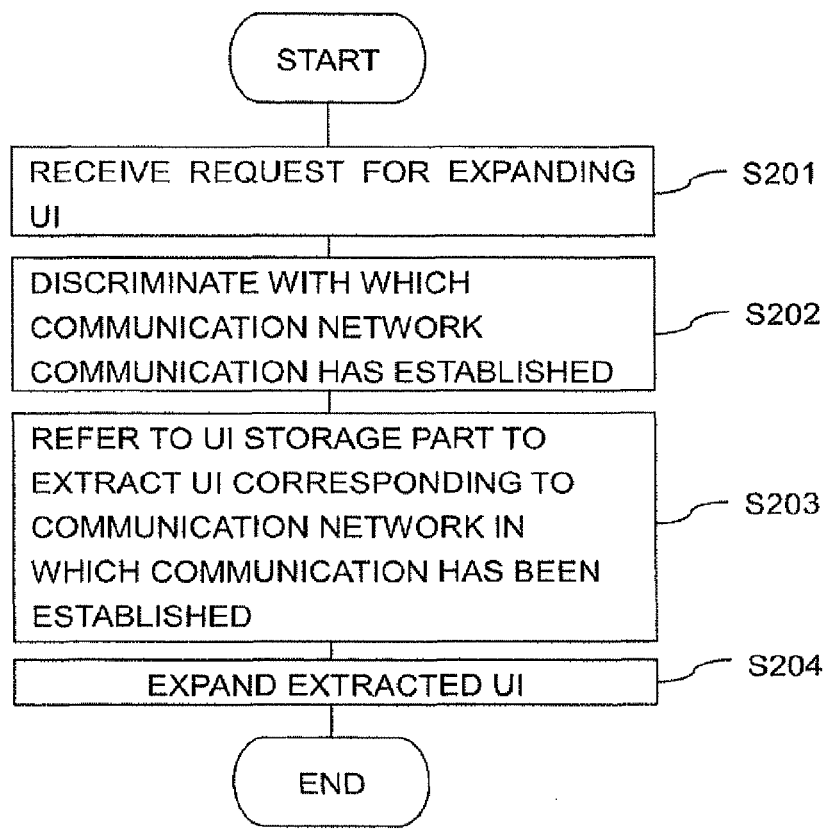
FIG. 12 is a processing flowchart illustrating a processing flow for deploying a UI according to a communication network in the present example.

FIG. 12 shows a processing flow up to the time when the UI according to the kind of the communication network is deployed on the mobile terminal 1B in Reference example 1.

In addition, the processing explained here signifies the processing performed after the mobile terminal 1B establishes communication with the wide area communication network NW1 or local area network NW2 according to start of an application for performing operation instructions in the mobile terminal B. The processing in which the mobile terminal 1B establishes communication with the wide area communication network NW1 or local area network NW2 is what is explained while referring to FIG. 5.

After communication has established, the mobile terminal 1B receives a request for deploying the UI (S201).

In response to the above, the communication network discrimination part 116 refers to the communication conditions storage part 113 to discriminate with which communication network the mobile terminal 1B has established communication (S202).

According to the discrimination results, the UI extraction part 117 refers to the UI storage part 112 to extract the UI according to the kind of the communication network (S203).

The extracted UI is displayed on the mobile terminal 1B by the input/output part 118 (S204).

The UI deployed here is what is prepared in advance according to the kind of the communication network. Accordingly, the user can grasp the kind of the communication network to perform operation by a glance from the UI.

Like Reference example 1, the UI that is deployed according to the kind of the communication network may be corresponded with the operation history for each communication network, for example. That is, the operation history of the user is accumulated for each kind of communication network. Based on the accumulated operation history, the UI is prepared such that the button corresponding to frequently used operation is made large and buttons are arranged according to the frequency in order. These are registered in the UI storage part 112 to be deployed according to the kind of the communication network.

Reference Example 2

In another example, switching of the kind of the communication network in which the mobile terminal 1 has established communication is detected and processing that has been registered in advance may be configured to be executed.

Figure 13:
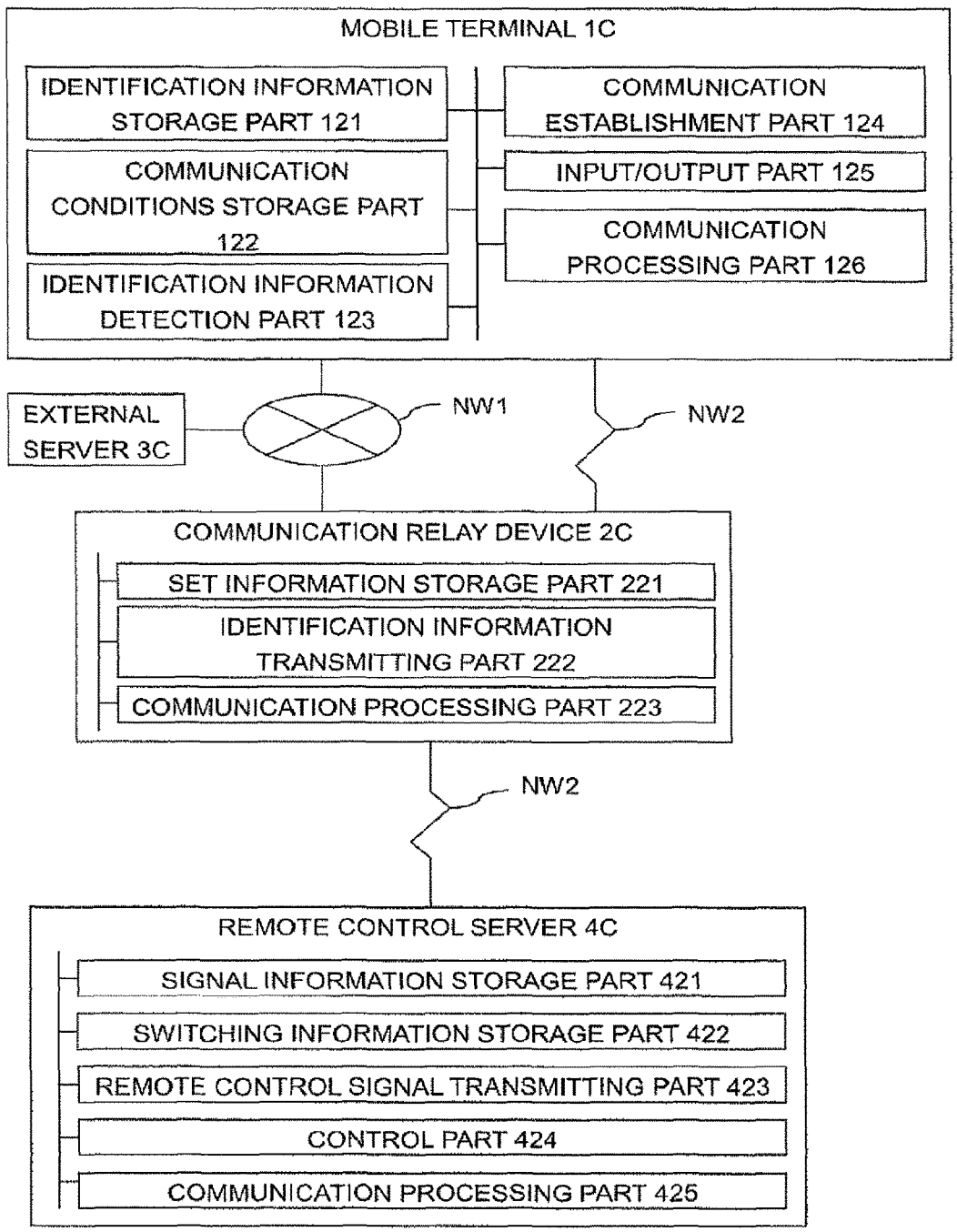
FIG. 13 is a function block diagram illustrating functions provided with each terminal or device in another reference example of the present invention.

FIG. 13 shows an example of the configuration of each terminal or device of Reference example 2. Further, FIG. 13 shows the minimum configuration of this example and functions of other examples may be added as needed.

In the same way as the above-mentioned mobile terminal 1A, a mobile terminal 1C is composed of what is called a cellular phone, a PDA (Personal Digital Assistance) and the like, including a function block composed of an identification information storage part 121, a communication conditions storage part 122, an identification information detection part 123, a communication establishment part 124, an input/output part 125, and a communication processing part 126.

In addition, respective functions of the identification information storage part 121, the communication conditions storage part 122, the identification information detection part 123, the input/output part 125, and the communication processing part 126 are the same as those of the above-mentioned identification information storage part 101, communication conditions storage part 103, identification information detection part 104, input/output part 108, and communication processing part 109, respectively.

In Reference example 2, when establishing communication with each communication network, the communication establishment part 124 refers to the communication conditions storage part 122 to establish communication with a communication network which is different from those with which communication has been already established. When discriminating that the kind of the communication network has switched, the communication establishment part 124 transmits information to that effect to a remote control server 4C via the communication processing part 126.

The remote control server 4C includes not only a signal information storage part 421, a remote control signal transmitting part 423, a control part 424, and a communication processing part 425 that correspond to the above-mentioned signal information storage part 401, remote control signal transmitting part 402, control part 403, and communication processing part 404 respectively but also a switching information storage part 422.

The switching information storage part 422 is a storage part that stores operation instruction information to be executed automatically when the kind of the communication network to which the mobile terminal 1C is connected is switched.

In this switching information storage part 422, operation instruction information to be executed is associated and stored according to contents of switching of the communication network as shown in FIG. 14.

In addition, respective configurations of the communication relay device 2C and the external server 3C are the same as those of the above-mentioned communication relay device 1A and external server 3A, respectively.

Figure 15:
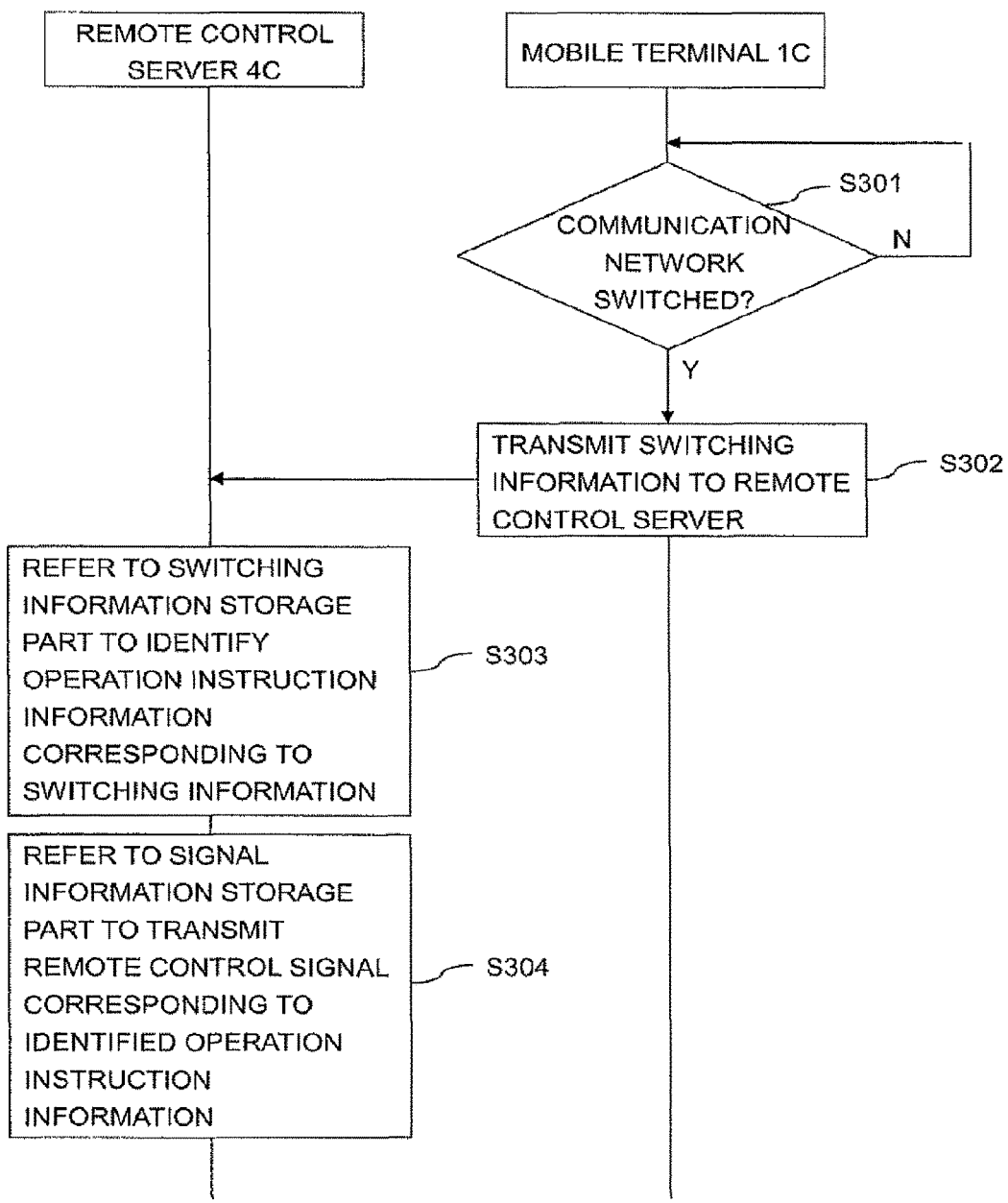
FIG. 15 is a sequence chart illustrating a processing flow for executing operation related to operation instruction information according to the switching of the communication network in the present example.

In Reference example 2, FIG. 15 shows the flow of processing from when the remote control server 4C receives information to the effect that the communication network has been switched from the mobile terminal 1C to when the operation in response thereto is executed.

When having established communication with each communication network, the communication establishment part 124 of the mobile terminal 1C refers to the communication conditions storage part 122 to establish communication with a communication network which is different from those with which communication has already been established and discriminates whether the kind of the communication network has been switched or not (S301).

As a result, when discriminating that the kind of the communication network has switched, the communication establishment part 124 transmits switching information to that effect to the remote control server 4C (S302).

In addition, the switching information includes information related to the kind of the communication network before and after switching.

The remote control server 4C that has received switching information refers to the switching information storage part 422 to identify the operation instruction information corresponding to the switching information by the control part 424 (S303).

Then, based on the identified operation instruction information, the remote control server 4C refers to the signal information storage part 421 to extract the corresponding remote control signal and at the same time controls the remote control signal transmitting part 423 to make it transmit the remote control signal (S304).

This makes it possible to detect that the communication network to which the mobile terminal 1C is connected has switched from the wide area communication network NW1 to the local area network NM2 that is formed by the communication relay device 2C installed at home when the user having stayed outdoors returns to the neighborhood of the home, for example. Then, as operation instruction information at the time of this switching, when air-conditioning and lighting are supposed to be operated, air-conditioning and lighting will have already been operated when the user returns home, offering a comfortable environment.

In addition, in this example, although the communication establishment part 124 provided with the mobile terminal 1C discriminates switching of the kind of the communication network, it is not limited thereto. A function part related to discrimination processing of switching of the communication network may be provided with the communication relay device 2C and external server 3C and based on connection conditions with the mobile terminal 1C in the communication relay device 2C or external server 3C, switching of the kind of the communication network may be discriminated.

That is, when the mobile terminal 1C establishes or breaks communication with the local area network NW2, the communication relay device 2C is made to detect it to make the remote control server 4C transmit the information. When the mobile terminal 1C establishes or breaks communication with the wide area communication network NW1, the external server 3C is made to detect it to make the remote control server 4C transmit the information.

In addition, switching of the kind of the communication in the present example includes not only mutual switching of the local area network NW2 or wide area communication network NW1 but also break from a communication state with each communication network or communication establishment from a break state.

Reference Example 3

In another example, when using a single remote control server 4 by a plurality of users, conflict of operation instruction information from each user may be prevented.

Figure 16:
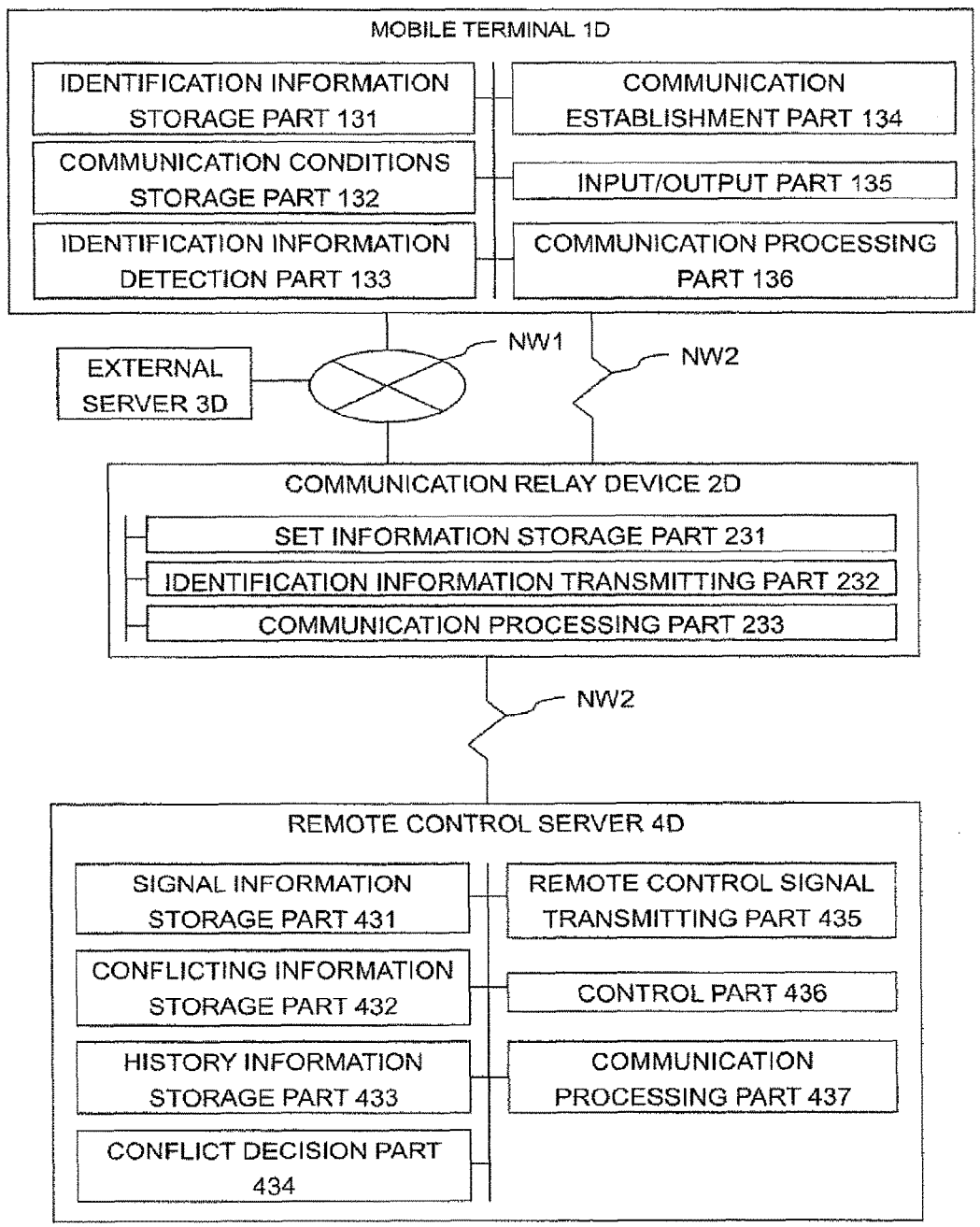
FIG. 16 is a function block diagram illustrating functions provided by each terminal or device in another reference example of the present invention.

FIG. 16 shows an example of each terminal or device of this example. In addition, FIG. 16 shows a minimum configuration of the present example and functions of other examples may be added as needed.

Respective configurations of the mobile terminal 1D, the communication relay device 2D, and the external server 4D in the present example are the same as those of the above mentioned mobile terminal 1A, communication relay device 2A, and external server 4A.

However, in the present example, a plurality of mobile terminals 1D access the remote control server 4D. Specifically, a case is assumed where a mobile terminal 1D owned by each family accesses a single remote control server 4D installed in the home.

In the remote control server 4D of the present example, a calculation device such as a CPU (Central Processing Unit) and a storage device such as a RAM (Random Access Memory) and a ROM (Read Only Memory) configure a function block composed of a signal information storage part 431, a conflicting information storage part 432, a history information storage part 433, a conflicting decision part 434, a remote control signal transmitting part 435, a control part 436, and a communication processing part 437.

In addition, respective functions of the signal information storage part 431, the remote control signal transmitting part 435, the control part 436, and the communication processing part 437 are the same as those of the signal information storage part 401, the remote control signal transmitting part 402, the control part 403, and the communication processing part 404, respectively.

The conflicting information storage part 432 is a storage part that makes operation instruction information that is discriminated to be conflicting associate with each other to store them.

In the conflicting information storage part 432, operation instruction information to be discriminated to be conflicting with each other and exceptional processing are associated and stored as shown in FIG. 17.

Here, operation instruction information to be conflicting with each other is not only operation instruction information such that both cannot be executed at one time such as switch-on of a heater and switch-on of cooling operation of an air-conditioner, and recording of two programs of a TV in the same time period but also a combination of operation instruction information decided to be inappropriate to perform simultaneously or in order. The operation instruction information that is conflicting with each other may be registered as needed, which the user can set.

The exceptional processing is information related to a case where operation is allowed even for conflicting operation instruction information.

Specifically, in the case of operation instruction information by the same mobile terminal 1D, operation instruction information is not made to be conflicting. Operation instruction information that has already been received is canceled and execution of operation related to new operation instruction information is allowed. According to the kind of the communication network through which the received operation instruction information has gone, execution of operation is allowed. As for the operation instruction information from a predetermined mobile terminal 1D, execution of operation is allowed preceding the operation instruction information from other mobile terminal 1D.

A history information storage part 433 is a storage part that stores information on history of execution of operation instruction information.

The history information storage part 433, as shown in FIG. 18, transmits a remote control signal based on operation instruction information and can store the date when an operation object apparatus 5 is operated, a terminal ID that identifies the mobile terminal ID that has requested execution of the operation related to operation instruction information, operation instruction information that has been executed, and the kind of the communication network through which operation instruction information has gone when receiving it from the mobile terminal 1D while associating them with each other.

The conflict decision part 434 refers to the conflicting information storage part 432 based on operation instruction information received from the mobile terminal 4D to identify conflicting operation instruction information. At the same time, the conflict decision part 434 refers to the history information storage part 433 to decide whether the conflicting operation instruction information is executed or has already been executed to decide permission/rejection of execution of operation related to the received operation instruction information.

In this processing, it is further decided whether the conflicting operation instruction information corresponds to exceptional processing and execution of operation can be allowed or not.

Figure 19:
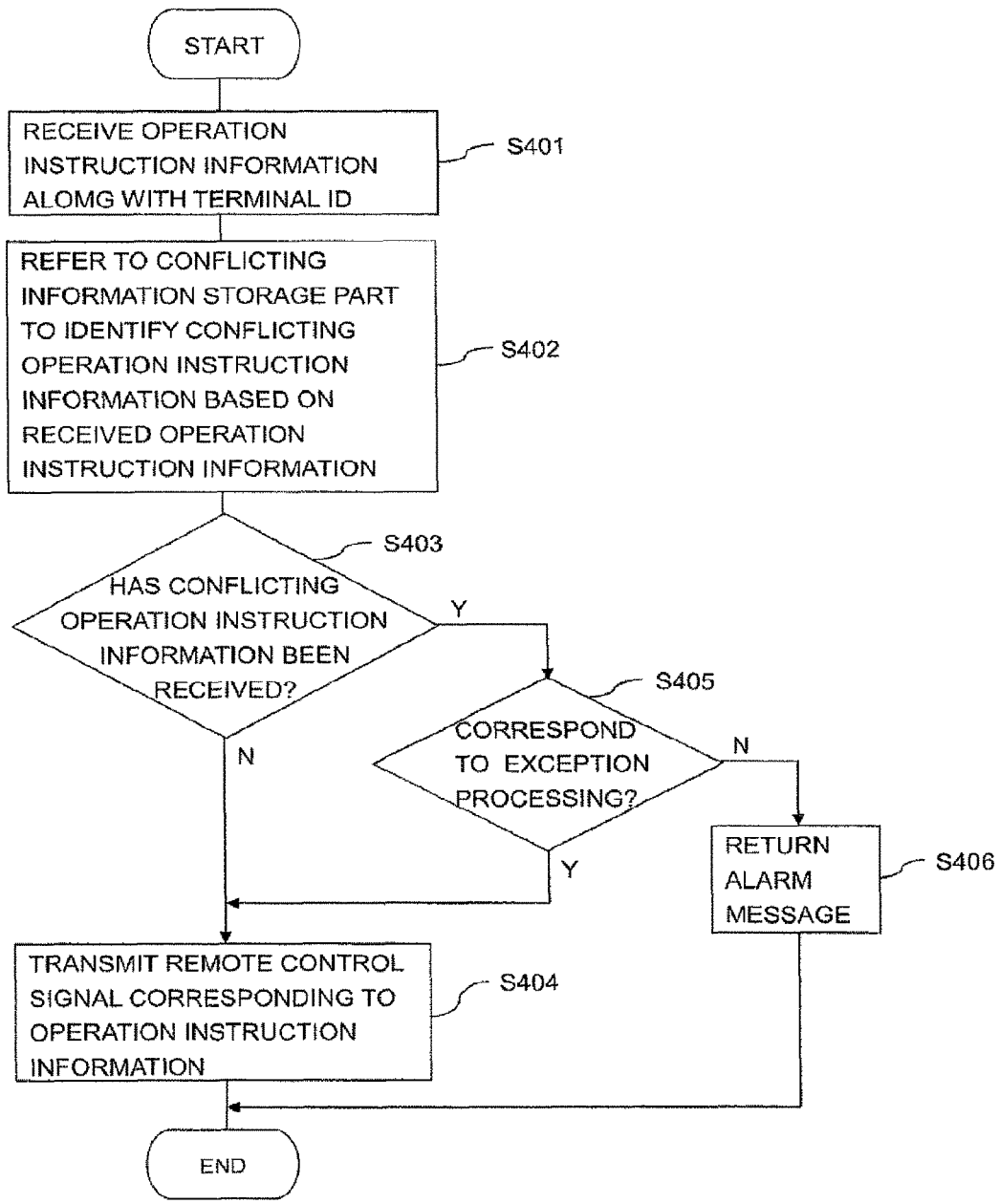
FIG. 19 is a processing flowchart illustrating a processing flow for executing operation related to operation instruction information while preventing conflict thereof in the present example.

Next, FIG. 19 shows the flow of processing from when the remote control server 4D receives operation instruction information from the mobile terminal 1D to execute operation in response thereto after conflict decision in the present example.

In addition, the remote control server 4D receives operation instruction information from the mobile terminal 1D as needed to store the history in the history information storage part 433 when operation based thereon is executed.

When receiving operation instruction information from the mobile terminal 1D (S401), the remote control server 4D refers to the conflicting information storage part 432 by the conflict decision part 434 to identify the conflicting operation instruction information based on the received operation instruction information (S402).

In addition, when receiving operation instruction information from the mobile terminal 1D, the remote control server 4D receives the terminal ID for discriminating the mobile terminal 1D and Information on the communication network showing through which communication network the operation instruction information has gone, as well.

The conflict decision part 432 refers to the history information storage part 433 to decide whether operation instruction information that conflicts with the received operation instruction information is executed or has already been executed (S403).

As a result, when the conflicting operation instruction information has not been executed yet, execution of operation related to the received operation instruction information is permitted, the remote control signal transmitting part 435 is controlled by the control part 436, and the remote control signal corresponding to operation instruction information is transmitted (S404).

On the other hand, the conflicting operation instruction information is discriminated to be executed or to have already been executed in the discrimination processing by S403, it is decided whether execution of operation related to received operation instruction information is permitted as exceptional processing or not (S405).

As a result, when execution of the operation as exceptional processing is permitted, the processing proceeds to the processing of S404 and the remote control signal according to the received operation instruction information is transmitted.

As a result of discrimination processing by S405, when the received operation instruction information does not apply to exception processing, execution of the operation related to the received operation instruction information is decided not to be permitted, an alarm message to the effect that execution is not permitted is returned to the mobile terminal 1D that has transmitted the operation instruction information, and processing is terminated (S406).

In addition, in the processing of S406, as a result of discrimination processing by S405, when the received operation instruction information does not apply even to the exceptional processing, an alarm message to the effect that execution is not permitted is returned. However, it is not limited thereto, and a confirmation message whether operation based on operation instruction information is forcibly executed or not while neglecting a series of decision is transmitted to the mobile terminal 1D that has transmitted operation instruction information. When receiving an execution request, the remote control signal in response to operation instruction information may be made to be transmitted.

Reference Example 4

In another example, a UI for inputting operation instruction signal on the mobile terminal 1 may be prepared and edited by the user, and at the same time, a control code of a specific remote control signal may be associated therewith to be made to be a package.

Figure 20:
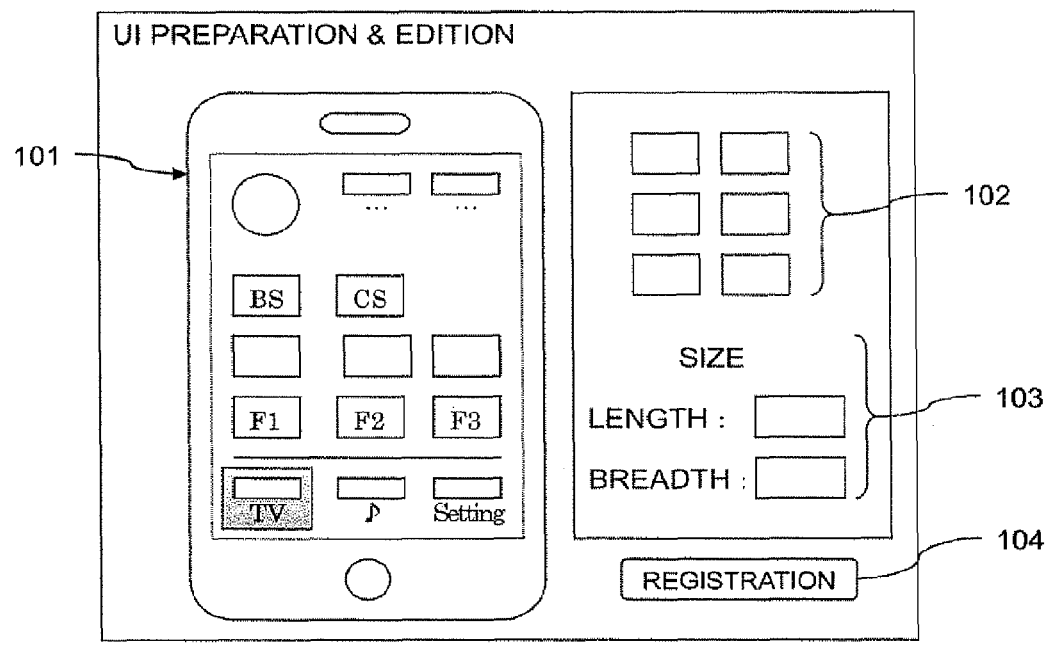
FIG. 20 is an exemplary diagram of a display at the time of preparing and editing a UI in another reference example of the present invention.

FIG. 20 shows an example of a preparation and edition screen when preparing and editing the UI. Preparing and editing UI can be performed by the mobile terminal 1, other personal computers and the like.

With a screen for preparing and editing the UI, a layout 101 when actually arranging a button that requests execution of operation related to operation instruction information, a group of buttons 102 that is settably prepared, edition setting 103 for changing the layout of the buttons, and a registration button 104 for storing the prepared and edited UI in a predetermined storage part.

This screen for preparing and editing UI is an example. Each button may be freely prepared by the user and various design changes are allowed.

Figure 21:
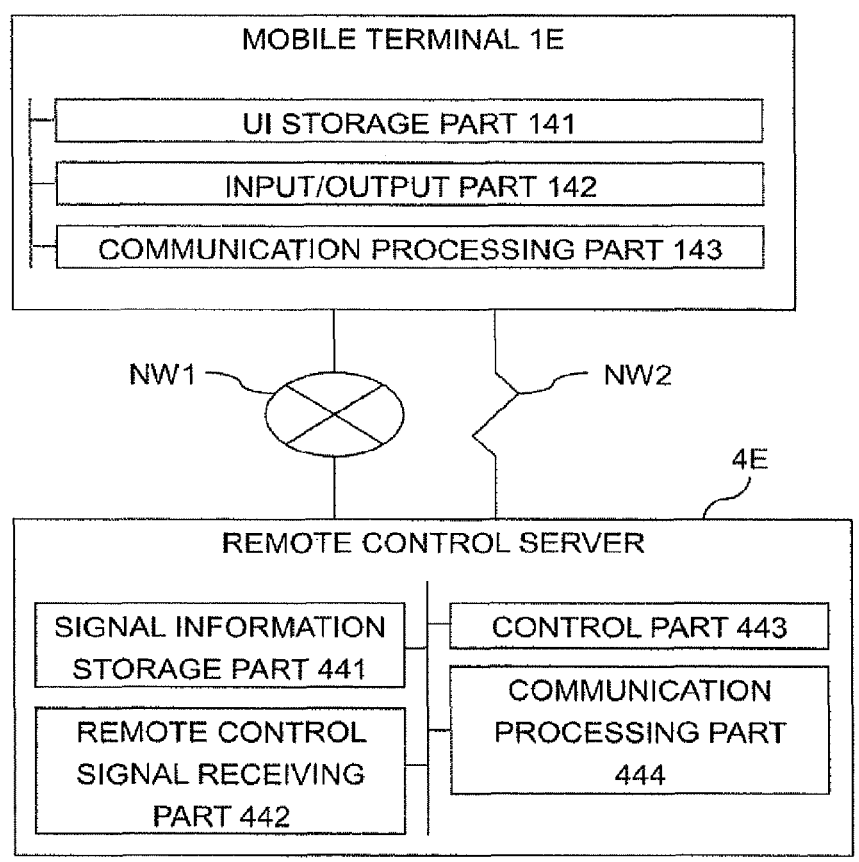
FIG. 21 is a function block diagram illustrating functions provided with each terminal or device of the present example.

FIG. 21 shows an example of a configuration of each terminal or device when associating each button with a control code of a remote control signal and the like regarding the UI prepared as the above. In addition, FIG. 21 shows a minimum configuration of the present example and functions of other examples may be added as needed.

The mobile terminal 1E and remote control server 4E in the present example are configured to be able to transmit and receive data via the wide area communication network NW1 and local area network NW2. The configuration for establishing communication with the wide area communication network NW1 and local area network NW2 is omitted here.

Like the above-mentioned mobile terminal 1A, the mobile terminal 1E is composed of what is called a cellular phone, a PDA (Personal Digital Assistance) and the like and is provided with a function block composed of a UI storage part 141, an input/output part 142, and a communication processing part 143.

In addition, the function of input/output part 142 and communication processing part 143 is the same as that of above-mentioned input/output part 108 and communication processing part 109, respectively.

The UI storage part 141 can store UI prepared by the way described in FIG. 20. In the present example, the UI stored in the UI storage part 141 is read and displayed and a control code of a predetermined remote control signal and the like are associated with each button.

A remote control server 4F includes a function block composed of a signal information storage part 441, a remote control signal receiving part 442, a control part 443, and a communication processing part 444 constituted by a calculation device such as a CPU (Central Processing Unit) and a storage device such as a RAM (Random Access Memory), a ROM (Read Only Memory).

In addition, the function of the control part 443, and communication processing part 444 is the same as that of the above-mentioned control part 403, and communication processing part 404 of the mobile terminal 1A, respectively.

A signal information storage part 441 is a storage part that can associate operation instruction information with a remote control signal to register them.

A remote control signal receiving part 442 receives a remote control signal from a remote controller for an operation object apparatus 5 to obtain its light emission pattern data. The obtained light emission pattern data is associated with operation instruction information to be registered in a signal information storage part.

In the above-mentioned configuration, when assigning each button of the UI stored in the UI storage part 141 with control information of the remote control signal, press down a button showing predetermined operation instruction information in the UI that has been deployed on the mobile terminal 1E.

On the other hand, the remote control server 4E obtains the remote control signal assigned to the pressed-down button by the remote control signal receiving part 442 by pressing down a predetermined button of the remote controller for the operation object apparatus 5.

Thus, the obtained remote control signal is associated with the operation instruction information to be registered in the signal information storage part 441.

By performing the above-mentioned processing for all the buttons, operation instruction information requested by depressing buttons displayed in the UI and the remote control signal are associated.

Data prepared in such a way may be made to be an application, for example, by being extracted from the UI storage part 141 and signal information storage part 441.

Further, data made to be an application is, for example, uploaded to a predetermined Web server and may be shared with other users.

In Reference example 4, with the button that instructs operation in the UI, a series of operation instruction information may be integrally configured in an executable fashion by macro operation so as to be able to totally execute a plurality of operation instruction information.

In this case, a series of operation instruction information corresponded to a single button is associated in the signal information storage part 441 of the remote control server 4E to be registered.

This allows a plurality of operation object apparatuses 5 such as the switch of lighting, switch of a DVD apparatus, and switch of a television to be operated at once and the environment that the user wish to create can be achieved at once, for example, when the user watches a movie on TV.

Reference Example 5

In another example, operation instruction information from the mobile terminal 1 is accumulated and various contents and the like may be recommended for the user based on the operation instruction information. In Reference example 5, specifically, various comments are assumed to be recommended based on audio-visual history of the television of the user. So that descriptions are given for examples assuming such a case.

Figure 22:
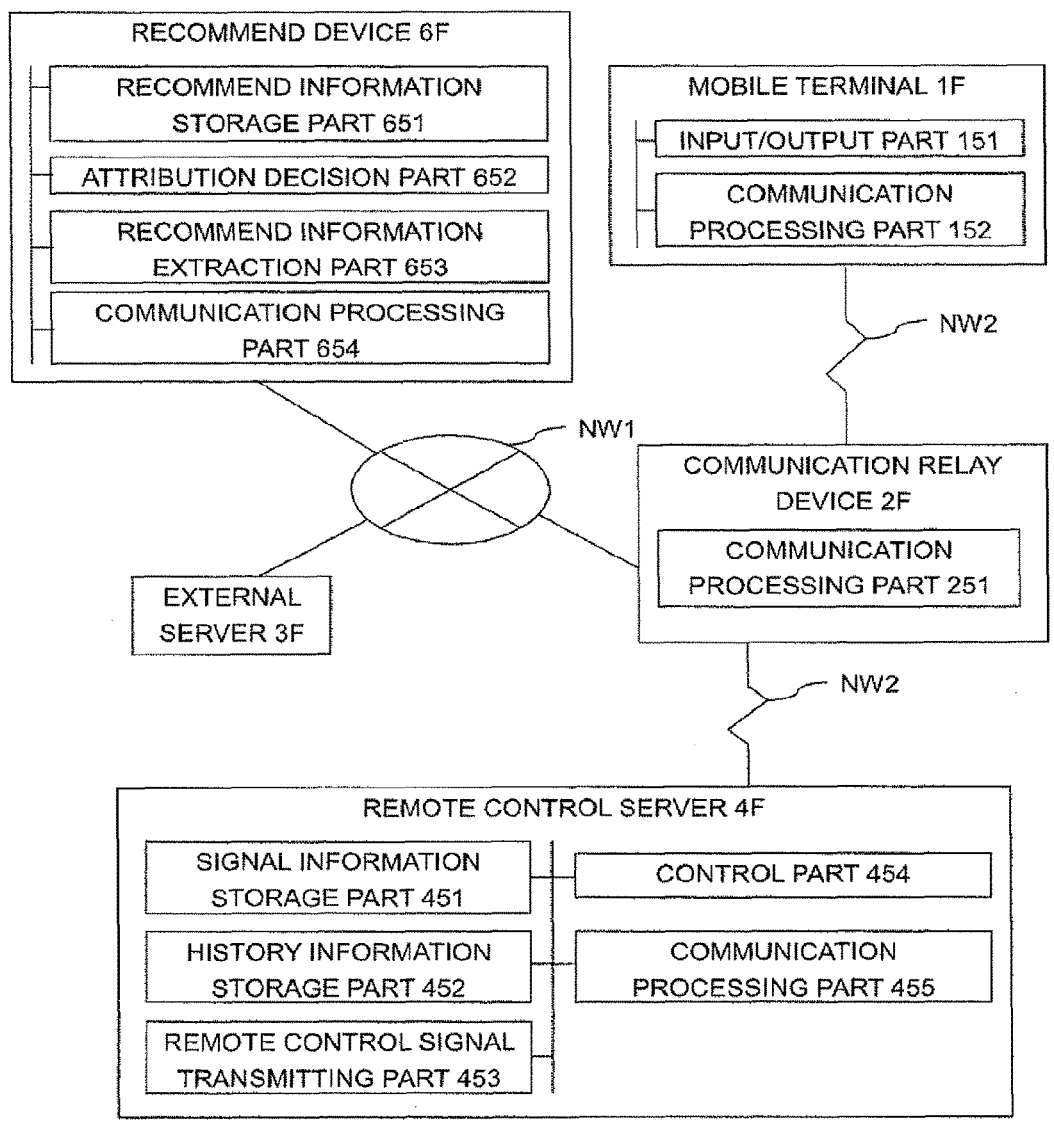
FIG. 22 is a function block diagram illustrating functions provided with each terminal or device of another reference example of the present invention.

FIG. 22 shows an example of configuration of the terminal and apparatus of such a case. In addition, FIG. 22 shows a minimum configuration of the present example and functions in other examples may be added as needed.

Here, the mobile terminal 1F, remote control serve 4F, and recommend device 6F are communicably configured via the wide area communication network NW1 and local area network NW2.

Like the above-mentioned mobile terminal 1A, the mobile terminal 1F is composed of what is called a cellular phone, a PDA (Personal Digital Assistance) and the like and is provided with a function block composed of an input/output part 151 and a communication processing part 152. In addition, the function of the input/output part 151 and communication processing part 152 is the same as that of above-mentioned input/output part 118 and communication processing part 119 of the above-mentioned mobile terminal 1A, respectively.

A remote control server 4F includes a function of each signal information storage part 451, history information storage part 452, remote control signal transmitting part 453, control part 454, and communication processing part 455 by a calculation device such as a CPU (Central Processing Unit) and a storage device such as a RAM (Random Access Memory) and a ROM (Read Only Memory).

A signal information storage part 451 is a storage part that stores a remote control signal in response to operation instruction information from the user like the above-mentioned signal information storage part 401.

A history information storage part 452 is a storage part that stores information on an execution history of operation instruction information like the above-mentioned history information storage part 433. In addition, in the present example, a TV program run or watched and listened based on operation is registered along with operation instruction information. For example, as shown in FIG. 23, an execution date and time of operation instruction information, a terminal ID for identifying the mobile terminal 1F that has transmitted operation instruction information, and a program run or looked and listened by operation based on operation instruction information are associated and stored. Information on a TV program that has run or watched and listened can be obtained from an external Web server and the like based on an execution date and time of operation instruction information, specified channel information and the like.

The remote control signal transmitting part 453, control part 454, and communication processing part 455 are the same function parts as the above-mentioned remote control signal transmitting part 402, control part 403, and communication processing part 404, respectively.

A recommend device 6F includes a function block composed of a recommend information storage part 651, an attribution decision part 652, a recommend information extraction part 653, and a communication processing part 654 by a calculation device such as a CPU (Central Processing Unit) and a storage device such as a RAM (Random Access Memory) and a ROM (Read Only Memory).

A recommend information storage part 651 is a storage part that stores information on contents and the like that are recommended to the user.

In the recommend information storage part 651, attribution of the user of a recommend object, information on a program to be recommended, and a remote control signal to be transmitted to the operation object apparatus 5 when watching and listening to the program are associated with each other and stored as shown in FIG. 24.

Although the remote control signal to be stored here is a signal for switching a TV to a channel of an associated program in advance, the remote control signal for turning on the power source of the TV may be included.

Since in some case where it is not clear which manufacturer is the TV of each user and by what kind of remote control signal is the TV operated, the remote control signal may include all the remote control signals that are transmitted for switching into a predetermined channel in each manufacturer. Since the remote control signal corresponding to the TV of a manufacturer that is different from the TV that the user utilizes is neglected and only valid remote control signal is received effectively, it is not necessary to care about difference in each manufacturer.

An attribution decision part 652 decides attribution of the user using each mobile terminal 1F based on history information stored in the history information storage part 452.

The processing coordinates history information for each terminal ID that discriminates the mobile terminal 1F and classifies program information included in the history information into attribution according to a predetermined classification to decide the attribution from its deviation.

A recommend information extraction part 653 extracts recommend information based on the attribution decided by the attribution decision part 652 while referring to the recommend information storage part 651.

A communication processing part 654 is a processing part that transmits/receives data to/from the mobile terminal 1F and remote control server 4F through the wide area communication network NW1 according to a predetermined protocol.

A communication relay device 2F and external server 3F have a function to form the local area network NW2 or wide area communication network NW1 to take a role in transmitting and receiving data.

FIG. 25 shows processing until recommend data is provided to the user in the present example.

The terminal ID and history information of the mobile terminal 4F that is a recommend object are transmitted from the remote control server 4F to the recommend device 6F at a predetermined timing (S501).

In response to the above, after extracting audio-visual program information in the history information based on the terminal ID, the attribution decision part 652 classifies the audio-visual program information according to a predetermined classification to decide attribution from its deviation (S502).

Then, the recommend information extraction part 653 extracts recommend data from the recommend information storage part 651 based on the decided attribution (S503).

Extracted recommend data is transmitted to the mobile terminal 1F (S504).

The user of the mobile terminal 1F that has received the recommend data transmits a request for executing operation by the remote control signal based on the recommend data along therewith to the remote control server 4F (S505).

In the remote control server 4F that has received the request, the control part 454 controls the remote control transmitting part 453 to make it transmit the remote control signal included in the recommend data (S506).

Thus, the user can easily watch and listen to the program suited to the user's taste.

In addition, in the present example, recommend data is specified to be transmitted to the mobile terminal 1F once. However, it is not limited thereto and the recommend data may be transmitted from the recommend device 6F to the remote control server 4F directly and the remote control signal contained in the recommend data may be transmitted.

In each above-mentioned example, part of the function part provided by the mobile terminals 1A, 1B, 1C, 1D, 1E, and 1F may be provided by the remote control servers 4A, 4B, 4C, 4D, 4E, and 4F. Conversely, part of the function part provided by the remote control servers 4A, 4B, 4C, 4D, 4E, and 4F may be provided by the mobile terminals 1A, 1B, 1C, 1D, 1E, and 1F, allowing changes in design as needed.

For example, the mobile terminals 1A, 1B, 1C, 1D, 1E, and 1F are made to provide the signal information storage parts 401, 411, 421, 431, 441, and 451 provided by the remote control servers 4A, 4B, 4C, 4D, 4E, and 4F. After receiving operation instruction information from the user, the operation instruction information is converted into a remote control signal while referring to the signal information storage parts 401, 411, 421, 431, 441, and 451 and the remote control signal may be transmitted to the remote control servers 4A, 4B, 4C, 4D, 4E, and 4F.

The configuration shown in each above-mentioned example is added into the configuration of other examples and a terminal and a server combining configurations of each example can be constructed.

Further, part of functions provided by the mobile terminals 1A, 1B, 1C, 1D, 1E, and 1F or part of function parts provided by the remote control servers 4A, 4B, 4C, 4D, 4E, and 4F may be made to be provided by the external servers 3A, 3B, 3C, 3D, and 3F and the external servers 3A, 3B, 3C, 3D, and 3F may be made to bear execution of part of functions.

For example, the permission/rejection information storage parts 102 and 405 and operation permission/rejection decision parts 107 and 407 provided by the mobile terminal 1A are made to be provided by the external server 3A and when the mobile terminal 1A communicates with the remote control server 4B via the wide area communication network NW1, the external server 3A may be made to execute decision of permission/rejection of operation.

Further, the conflicting information storage part 432, history information storage part 433, and conflict decision part 434 provided by the remote control server 4D are made to be provided by the external server 3D and when the mobile terminal 1D communicates with the remote control server 4D via the wide area communication network NW1, the external server 3D may be made to execute conflict decision.

In addition, the history information storage part 452 provided by the remote control server 4F may be made to be provided by the external server 3F and history information may be extracted from the external server 3F.

In the above-mentioned embodiments, the remote control servers 4A, 4B, 4C, 4D, 4E, and 4F may be installed in plural. For example, the remote control servers 4A, 4B, 4C, 4D, 4E, and 4F are installed in each room of the home of the user and an operation object apparatus 5 for each room is operated.

In this case, identification information (an IP address, a serial number, a MAC address, and the like) of the remote control servers 4A, 4B, 4C, 4D, 4E, and 4F is included in operation instruction information and operation may be instructed to particular remote control servers 4A, 4B, 4C, 4D, 4E, and 4F. The remote control servers 4A, 4B, 4C, 4D, 4E, and 4F that transmit operation instruction information do not have to be a single remote control server 4A, 4B, 4C, 4D, 4E, or 4F for single operation instruction information. By specifying a plurality of identification information at a time, simultaneous processing may be requested for a plurality of remote control servers 4A, 4B, 4C, 4D, 4E, or 4F.

Accordingly, different operation for each room and consolidated operation of each room are possible. Further, different from a method in which a base unit manages a client device, hardware can be simplified, allowing development cost to be reduced. When any of the remote control servers 4A, 4B, 4C, 4D, 4E, and 4F should fail, apparatuses other than the failed extent are effective. Regardless of the specification of hardware of the base unit, functions of the entire system can be flexibly improved by updating the version of client software.

In the above-mentioned embodiments, an external Web server may be made to have function parts other than functions for controlling transmission of the remote control signal and for data communication such as the signal information storage part and conditions information storage part that are specified to be provided by the remote control server 4A to 4F.

What is claimed is:

1. A remote control server which is configured to communicate with a remote control terminal via a particular local area network or a wide area communication network, the remote control terminal remotely controlling an operation object apparatus, wherein
the remote control terminal includes:
a permission/rejection information storage unit configured to store whether execution of a remote control operation is permitted or rejected based on operation instruction information when the operation instruction information goes through either communication network, the particular local area network or the wide area communication network;
an operation instruction information receiving unit configured to receive an input of the operation instruction information by a user;
a communication network discrimination unit configured to discriminate in which communication network communication has been established, the particular local area network or the wide area communication network;
an operation permission/rejection decision unit configured to refer to the permission/rejection information storage unit according to discrimination results to make a decision of whether execution of the received operation instruction information is permitted or rejected;
an operation instruction information transmitting unit configured to transmit the received operation instruction information to the remote control server when the remote control operation based on the operation instruction information is permitted as a result of the decision; and the remote control server is configured to transmit a remote control signal so as to control the operation object apparatus, the remote control server comprising:

a signal information storage unit configured to store a remote control signal according to operation instruction from the user;

a remote control signal transmitting unit configured to transmit the remote control signal to the operation object apparatus;

an operation instruction information receiving unit configured to receive the operation instruction from the remote control terminal;

a control unit configured to refer to the signal information storage unit to identify the remote control signal corresponding to the operation instruction information and control the remote control signal transmitting unit to transmit the identified remote control signal to the operation object apparatus.

2. The remote control server of claim 1, wherein the remote control server is integrally configured with a communication relay device which forms the particular local area network to play part as an access point.

3. The remote control server of claim 1, wherein identification information of the remote control server is included in the operation instruction information.

4. A method of controlling an operation object apparatus by a computer which is configured to communicate with a remote control terminal via a particular local area network or a wide area communication network, the remote control terminal remotely controlling the operation object apparatus, wherein the remote control terminal includes:

a permission/rejection information storage unit configured to store whether execution of a remote control operation is permitted or rejected based on operation instruction information when the operation instruction information goes through either communication network, the particular local area network or the wide area communication network;

an operation instruction information receiving unit configured to receive an input of the operation instruction information by a user;

a communication network discrimination unit configured to discriminate in which communication network communication has been established, the particular local area network or the wide area communication network;

an operation permission/rejection decision unit configured to refer to the permission/rejection information storage unit according to discrimination results to make a decision of whether execution of the received operation instruction information is permitted or rejected;

an operation instruction information transmitting unit configured to transmit the received operation instruction information to the remote control server when the remote control operation based on the operation instruction information is permitted as a result of the decision; and the computer includes:

a signal information storage unit configured to store a remote control signal according to operation instruction from the user; and the method performs:

a process of transmitting the remote control signal to the operation object apparatus;

a process of receiving the operation instruction from the remote control terminal;

a process of referring to the signal information storage unit to identify the remote control signal corresponding to the operation instruction information and controlling the remote control signal transmitting unit to transmit the identified remote control signal to the operation object apparatus.

5. A non-transitory computer-readable medium, which allows a computer to control an operation object apparatus, configured to communicate with a remote control terminal via a particular local area network or a wide area communication network, the remote control terminal remotely controlling the operation object apparatus, wherein the remote control terminal includes:

a permission/rejection information storage unit configured to store whether execution of a remote control operation is permitted or rejected based on operation instruction information when the operation instruction information goes through either communication network, the particular local area network or the wide area communication network;

an operation instruction information receiving unit configured to receive an input of the operation instruction information by a user;

a communication network discrimination unit configured to discriminate in which communication network communication has been established, the particular local area network or the wide area communication network;

an operation permission/rejection decision unit configured to refer to the permission/rejection information storage unit according to discrimination results to make a decision of whether execution of the received operation instruction information is permitted or rejected;

an operation instruction information transmitting unit configured to transmit the received operation instruction information to the remote control server when the remote control operation based on the operation instruction information is permitted as a result of the decision; and the computer includes:

a signal information storage unit configured to store a remote control signal according to operation instruction from the user; and the non-transitory computer-readable medium comprises instructions executed by the computer to perform:

a process of transmitting the remote control signal to the operation object apparatus;

a process of receiving the operation instruction from the remote control terminal;

a process of referring to the signal information storage unit to identify the remote control signal corresponding to the operation instruction information and controlling the remote control signal transmitting unit to transmit the identified remote control signal to the operation object apparatus.

* * * * *